(12) United States Patent　　(10) Patent No.: US 12,080,445 B2
Estrada et al.　　(45) Date of Patent: Sep. 3, 2024

(54) SUPERCONDUCTING CABLE JOINT AND RELATED TECHNIQUES

(71) Applicant: Massachusetts Institute of Technology, Cambridge, MA (US)

(72) Inventors: Jose Estrada, Lawrence, MA (US); Rui Vieira, Billerica, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 331 days.

(21) Appl. No.: 17/333,311

(22) Filed: May 28, 2021

(65) Prior Publication Data

US 2021/0375507 A1　　Dec. 2, 2021

Related U.S. Application Data

(60) Provisional application No. 63/032,279, filed on May 29, 2020.

(51) Int. Cl.
*H01B 12/00* (2006.01)
*H01B 12/02* (2006.01)
*H01B 13/00* (2006.01)

(52) U.S. Cl.
CPC ............ *H01B 12/02* (2013.01); *H01B 13/00* (2013.01)

(58) Field of Classification Search
CPC .................................. H01R 4/68; H01B 12/02
See application file for complete search history.

(56) References Cited

U.S. PATENT DOCUMENTS

| 2,309,607 | A | 1/1943 | Rogoff |
| 9,941,032 | B2 | 4/2018 | Jin et al. |
| 2016/0240297 | A1* | 8/2016 | Iwasa ................ H01B 12/02 |
| 2018/0226730 | A1* | 8/2018 | Fietz ................ H01R 4/187 |

(Continued)

FOREIGN PATENT DOCUMENTS

| CN | 106911014 | 6/2017 |
| CN | 107104293 | 8/2017 |
| CN | 109148074 | 1/2019 |

(Continued)

OTHER PUBLICATIONS

Naito JP 2005310507 A1 English Translation (Year: 2005).*

(Continued)

*Primary Examiner* — Pete T Lee
(74) *Attorney, Agent, or Firm* — Daly, Crowley, Mofford & Durkee, LLP

(57) ABSTRACT

An electrical joint includes a conductive member having a first mounting region configured to connect to a first conductor and a second mounting region configured to connect to a second conductor, wherein the first conductor comprises a cable and a superconducting material within the conductive member and configured to conduct a current between the first and second mounting regions. Also described is a method of forming an electrical joint, comprising forming a conductive member having a first mounting region configured to connect to a first conductor and a second mounting region configured to connect to a second conductor, wherein the first conductor comprises a cable and a superconducting material within the conductive member and configured to conduct a current between the first and second mounting regions.

30 Claims, 15 Drawing Sheets

(56) References Cited

U.S. PATENT DOCUMENTS

2020/0005968 A1* 1/2020 van der Laan ........ H01B 12/04
2021/0376498 A1 12/2021 Craighill et al.

FOREIGN PATENT DOCUMENTS

| FR | 1585965 | 2/1970 |
|---|---|---|
| JP | S 57194467 | 11/1982 |
| WO | WO 2015/129272 | 9/2015 |
| WO | WO 2021/257145 64 | 12/2021 |

OTHER PUBLICATIONS

Rong CN 109148074 A; English Translation; published in 2019 (Year: 2019).*
U.S. Appl. No. 17/777,488, filed May 17, 2022, Hartwig, et al.
Bykovsky, et al.; "Damage Investigations in the HTS Cable Prototype After the Cycling Test in EDIPO"; IEEE Transactions on Applied Superconductivity; vol. 28; No. 4; Jun. 2018; 5 Pages.
Goyal, et al. "High critical current density superconducting tapes by epitaxial deposition of $YBa_2Cu_3O_x$ thick films on biaxially textured metals"; Applied Physics Letters 69 (12); pp. 1795-1797; Sep. 1996; 3 Pages.
Markiewicz, et al.; "Design of a Superconducting 32 T Magnet with REBCO High Field Coils"; IEEE Transactions on Applied Superconductivity; vol. 22; No. 3; Jun. 2012; 4 Pages.
Mei, et al.; "Effects of Cooling Rate on Mechanical Properties of Near-Eutectic Tin-Lead Solder Joints"; Journal of Electronic Materials; vol. 20; No. 8; pp. 599-608; Jan. 1991; 10 Pages.
Prasad, et al.; "Fabrication of new joints for SST-1 TF coil winding packs"; Fusion Engineering and Design 88; pp. 2945-2949; Jan. 2013; 5 Pages.
Search Report and Written Opinion of the ISA dated Mar. 17, 2021 for International Application No. PCT/US2020/062793; 15 Pages.
Takayasu, et al.; "Cabling Method for High Current Conductors Made of HTS Tapes"; IEEE Transactions on Applied Superconductivity; vol. 21; No. 3; pp. 2340-2344; Jun. 2011; 5 Pages.
Tsui, et al.; "Soldered joints—an essential component of demountable high temperature superconducting fusion magnets"; Superconductor Science and Technology 29; Jan. 2016; 16 Pages.
Uglietti, et al.; "Progressing in cable-in-conduit for fusion magnets: from ITER to low cost, high performance DEMO"; Superconductor Science and Technology 31; Jan. 2018; 10 Pages.
Usoskin, et al.; "Large Area YBCO-Coated Stainless Steel Tapes With High Critical Currents"; IEEE Transactions on Applied Superconductivity; vol. 13; No. 2; pp. 2452-2457; Jun. 2003; 6 Pages.
Van der Laan, et al.; "Status of CORC® cables and wires for use in high-field magnets and power systems a decade after their introduction"; Superconductor Science and Technology; 32; 2019; 63 Pages.
Office Action dated Jun. 23, 2023 for U.S. Appl. No. 17/333,314; 9 Pages.
Restriction Requirement dated Mar. 30, 2023 for U.S. Appl. No. 17/333,314; 5 Pages.
Response to Restriction Requirement dated Mar. 30, 2023 for U.S. Appl. No. 17/333,314, filed May 30, 2023; 2 Pages.
Preliminary Amendment dated May 17, 2022 for U.S. Appl. No. 17/777,488; 6 Pages.
International Preliminary Report on Patentability dated Jun. 16, 2022 for International Application No. PCT/US2020/062793; 9 Pages.
Response to Comm. Rule 161/162 dated Jul. 13, 2022, filed on Dec. 1, 2022 for International Application No. 20829242.5; 22 Pages.
Japanese Office Action dated May 8, 2023 for Japanese Application No. JP 2022-533433; 6 Pages.
Response (w/ English translation of amended Claims) to Japanese Office Action dated May 8, 2023 for Japanese Application No. JP 2022-533433, filed on Jul. 19, 2023; 8 Pages.
Haight et al., "Re-Markable Joint with Insulation for REBCO Superconductor Cables", IEEE Transactions on Applied Superconductivity, Vo. 29, No. 5, Aug. 2019; 5 pages.
Imagawa et al., "Test of ITER-TF Joint Samples with NIFS Test Facilities", IEEE Transactions on Applied Superconductivity, vol. 28, No. 3, Apr. 2018; 5 Pages.
Maeda et al., "The MIRAI Program and the New Super-High Field NMR Initiative and Its Relevance to the Development of Superconducting Joints in Japan", IEEE Transactions on Applied Superconductivity, vol. 29, No. 5, Aug. 2019; 9 Pages.
Martovetsky et al., "Qualification of the Joints for the ITER Central Solenoid", IEEE Transactions on Applied Superconductivity, vol. 22, No. 3, Jun. 2012; 4 Pages.
Takahashi et al., "Development of ITER-CS Model Coil Terminal Assembling by Using Indium Wires", Fusion Engineering and Design, pp. 58-59 and 93-97; Jan. 2001; 5 Pages.
Yao et al., "R&D Activities of Joint Manufacture for ITER Poloidal Field Coil", Plasma Science Technology, vol. 17, No. 7;Jul. 2015; 6 Pages.
Japanese Office Action dated Aug. 28, 2023 for JP Application No. 2022-533433; 5 Pages.
Notice of Allowance dated Oct. 6, 2023 for U.S. Appl. No. 17/333,314; 11 Pages.
Response (with Amended Claims in English) to Japanese Office Action dated Aug. 28, 2023 for Japanese Application No. 2022-533433; Response filed on Nov. 21, 2023; 7 pages.

* cited by examiner

SUPERCONDUCTING CABLE JOINT AND RELATED TECHNIQUES

CROSS-REFERENCE TO RELATED APPLICATIONS

This application claims the benefit under 35 U.S.C. § 119(e) of U.S. provisional application 63/032,279 filed May 29, 2020 which application is hereby incorporated herein by reference in its entirety.

GOVERNMENT RIGHTS

Not applicable.

BACKGROUND

It is sometimes necessary to join a superconducting cable to another conductor. For example, in some applications, it may be necessary to electrically join two superconducting cables, or it may be necessary to join a superconducting cable to a normal (i.e. non-superconducting) conductor. The structure used to join a superconducting cable to another conductor is referred to as a "cable joint" or more simply a "joint."

Since when held at cryogenic temperatures, superconductors are lossless, it is favorable to utilize joints having a resistance characteristic which is as small as possible since any electrical resistance in the joint results in joule heating due to current passing through the joint from the superconductor to the other conductor. In applications in which superconducting cables carry relatively high current (e.g. superconducting cables which carry tens of kiloamps) this issue may be pronounced.

SUMMARY

Described are concepts, systems, structures and techniques directed towards superconducting joints and the manufacture thereof. Superconducting joints provided in accordance with the concepts described herein may have short joint lengths, low resistivity and can be mechanically robust compared with prior art joints for the same applications.

In general overview, a superconducting joint includes superconducting material provided within a conducting member shaped so as to electrically couple first and second conductors, at least one of which has superconducting characteristics. In some embodiments at least one of the conductors may be a superconducting cable. The superconducting material is disposed within the conducting member so as to provide a superconducting signal path between the first and second conductors. In embodiments, the superconducting material may comprise one or more high temperature superconducting (HTS) tapes. In embodiments, the first and second conductors may be superconducting cables such as HTS cables. In embodiments the first conductor may be a superconductor and the second conductor may be a normal (i.e. non-superconducting) conductor (e.g. in the case of a termination to a power supply).

In embodiments, the first and second conductors are disposed (e.g. pressed or otherwise inserted) in mounting regions of the conducting member. In embodiments, at least one of the mounting regions of the conducting member has a malleable metal disposed thereon. Upon inserting a conductor to be joined into a mounting region of the conducting member, the malleable metal forms an electrically conductive layer (also sometimes referred to as an interface layer) in the mounting region. The electrically conductive layer is disposed between respective surfaces of the mounting regions and one or more surfaces of the conductors to be joined. The electrically conductive interface layer promotes electrical conduction between the conductors disposed in the mounting regions of the conducting member.

In embodiments, clamps or other suitable structures may be used to press and/or otherwise secure the cables within the mounting regions. In embodiments, the clamps or other suitable structure may be removable. Thus, superconducting joints provided in accordance with the concepts described herein allow "demounting" and "remounting" of superconducting and/or normal conductor structures. Such a characteristic may be useful, for example, in the case of re-usable test fixtures or magnets where it is advantageous to disassemble a magnet during the life of the magnet.

In accordance with one aspect of the concepts, structures and techniques described herein, a superconducting cable joint includes a conductive member having a first mounting surface having a shape configured to accept a first superconductor, a second mounting surface having a shape configured to accept a second conductor and having a cavity region between the first and second mounting surfaces. A superconducting insert is disposed in the conductive member. In embodiments, the superconducting insert comprises a superconducting material configured to provide a superconducting signal path between the first and second mounting surfaces of the saddle member.

With this particular arrangement, a superconducting joint suitable for use with high-temperature superconductor (HTS) cables is provided. When the HTS cables are provided having a circular or semi-circular cross-sectional shape, the conductive member is provided having a so-called double-saddle shape. The superconducting joint has an electrical resistance characteristic between two conductors coupled thereto which is lower than an electrical resistance characteristic of a conventional joint. Also, the superconducting joint has a mechanical robustness and thus is able to resist large electromagnet forces in an operating environment. Further, superconducting joints provided in accordance with the concepts, structures and techniques described herein are highly manufacturable and cost effective compared with the manufacturability and cost of conventional joints. In embodiments, the superconducting material may comprise an HTS tape. According to some embodiments, the HTS may comprise a rare earth barium copper oxide superconductor (REBCO), such as yttrium barium copper oxide (YBCO). In some embodiments, the HTS may comprise a co-wound stack of HTS tape. In embodiments, the HTS tape may comprise a long, thin strand of HTS material with cross-sectional dimensions in the range of about 0.001 mm to about 0.1 mm in thickness (or height) and a width in the range of about 1 mm to about 12 mm (and with a length that extends along the length of the cable, e.g., into and out of the page in the example of FIG. 1). According to some embodiments, each strand of HTS tape may comprise an HTS material such as REBCO in addition to an electrically conductive material. In some embodiments, the electrically conductive material may be disposed on the REBCO. In some embodiments, the electrically conductive material may be a cladding material such as copper. In some embodiments, HTS tape may comprise a polycrystalline HTS and/or may have a high level of grain alignment.

In such embodiments, the HTS tape is oriented such that the superconducting material (e.g. the REBCO-HTS side of a REBCO tape) is disposed nearest to the conductor.

In accordance with a still further aspect of the concepts described herein, a method for providing a superconducting joint includes (a) providing an opening in a conductive member; (b) disposing superconducting material into the opening with the superconducting material configured so as to provide a superconducting path between at least first and second conductor mounting surfaces of the conductive member.

With this particular arrangement, a method for providing a superconducting joint having a joint resistance which is less than the resistance of a conventional joint is provided. In embodiments, disposing superconducting material into the conductive member comprises inserting HTS tape into the opening of the conductive member. In embodiments, the superconducting material comprises at least one of an HTS material and Low temperature superconducting (LTS) material. Embedding, packing or otherwise disposing superconducting material in an electrically conductive member decreases the total electrical resistance of the joint compared with the total electrical resistance of a conventional joint. Furthermore, a joint provided in accordance the concepts described herein results in a simple, robust, manufacturable, superconducting joint.

In embodiments, HTS cables are disposed (e.g. pressed or otherwise inserted) into a conductive member having a saddle shape and having HTS tape disposed therein with a conductive metal disposed between a surface of the HTS conductor and a surface of the conductive HTS saddle member. In embodiments, a metal which is malleable (e.g. soft) at room temperature may be used. In embodiments, a metal which deforms to allow a continuous, and thus low resistance, contact between a surface of the HTS conductor and a surface of the saddle member may be used. In embodiments, the metal may be provided as indium.

In accordance with a further aspect of the concepts, structure and techniques described herein, a method for making a superconducting joint appropriate for joining first and second HTS superconducting cables includes (a) providing a conductive member having a shape selected to accept first and second conductors, one of which may be an HTS cable; embedding, packing or otherwise disposing an HTS superconductor within the conductive member.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

Described herein is a superconducting joint which enables electrical connections between, for example, two superconducting cables or between a superconducting cable and a normal conductor. For example, a superconducting joint provided in accordance with the concepts described herein may be used to enable connections between two or more superconducting cables or between one or more superconducting conductors and a power supply terminal. Superconducting joints provided in accordance with the concepts described herein have an electrical resistance characteristics (and thus associated Joule heating) which is less than electrical resistance characteristics achieved with prior art cable joints.

Furthermore, superconducting joints provided in accordance with the concepts described herein allow "demounting" and "remounting" of superconducting and/or normal conductor structures. Such a characteristic may be useful, for example, in the case of re-usable test fixtures or magnets where it is advantageous to disassemble a magnet during the life of the magnet.

Furthermore, superconducting joints provided in accordance with the concepts described herein may be smaller than conventional joints in similar applications which may be desirable in superconducting applications, since space may be limited in superconducting applications.

Although several specific superconducting joints are described herein, it is recognized that many variations are possible. Such variations are understood to be within the scope of this disclosure. Also, reference is sometimes made herein to a particular type of superconducting cable. Although reference is sometimes made to a particular superconducting cable geometry, those of ordinary skill in the art will appreciate that the superconducting joint structures and techniques described herein may be utilized with any type of superconducting cable including superconducting cables having any geometry or provided using any technique. After reading the disclosure provided herein, one of ordinary skill in the art will understand how to make any appropriate joint modifications needed to accommodate a particular type of superconducting cable or a particular type of superconducting cable geometry or configuration.

Figure 1:
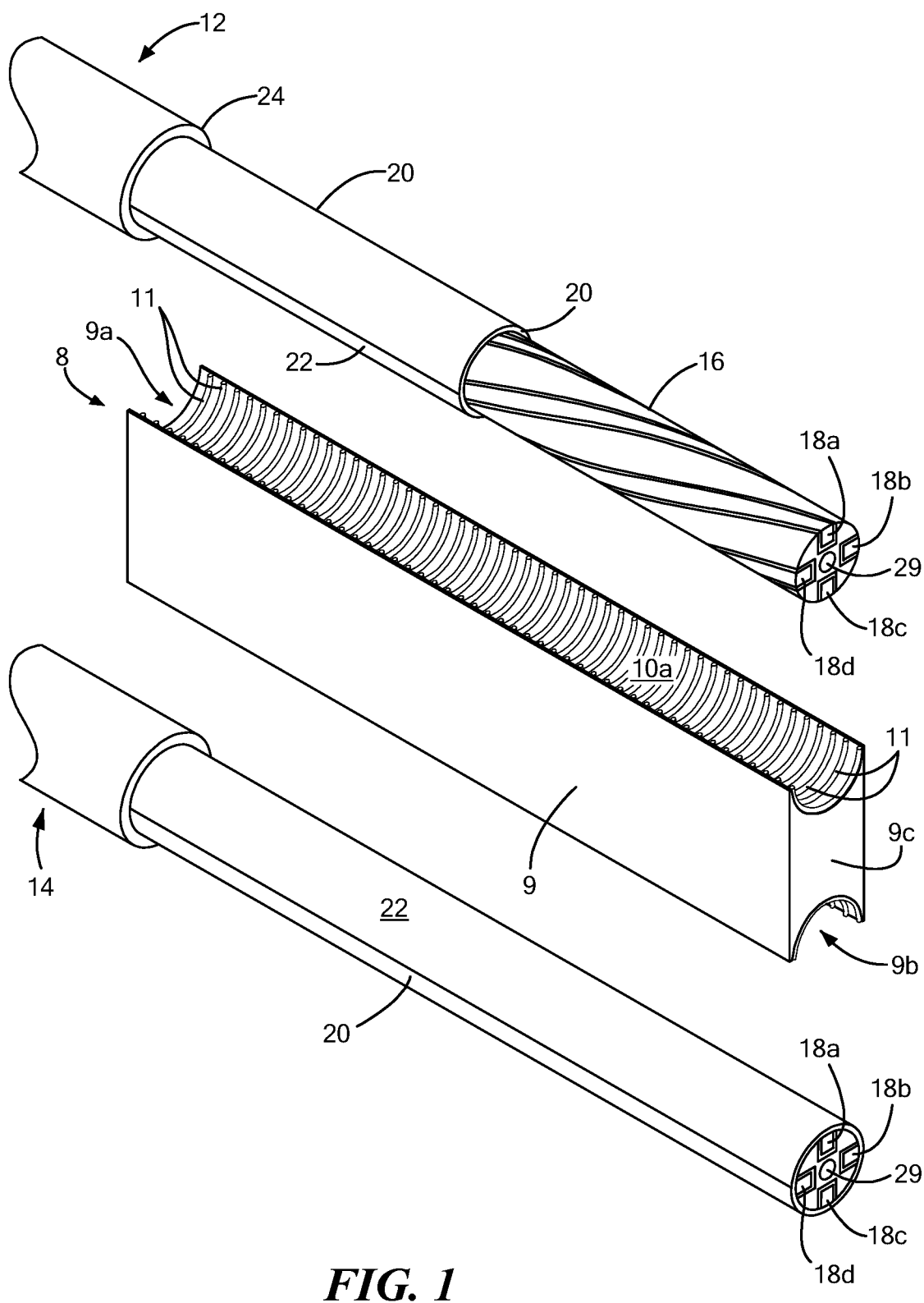
FIG. 1 is an exploded perspective view of two superconducting cables coupled by a superconducting cable joint.
Figure 1A:
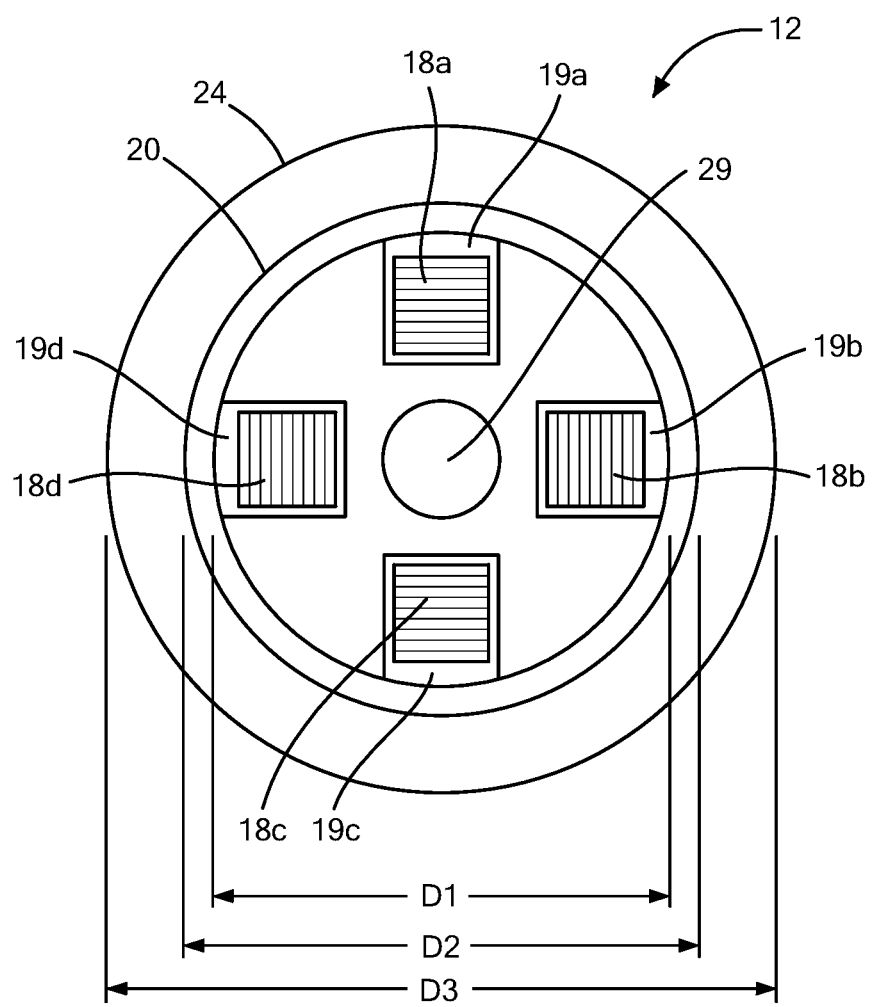
FIG. 1A is an end view of a high temperature superconducting (HTS) cable which may be the same as or similar to the cables shown in FIG. 1.
Figure 1B:
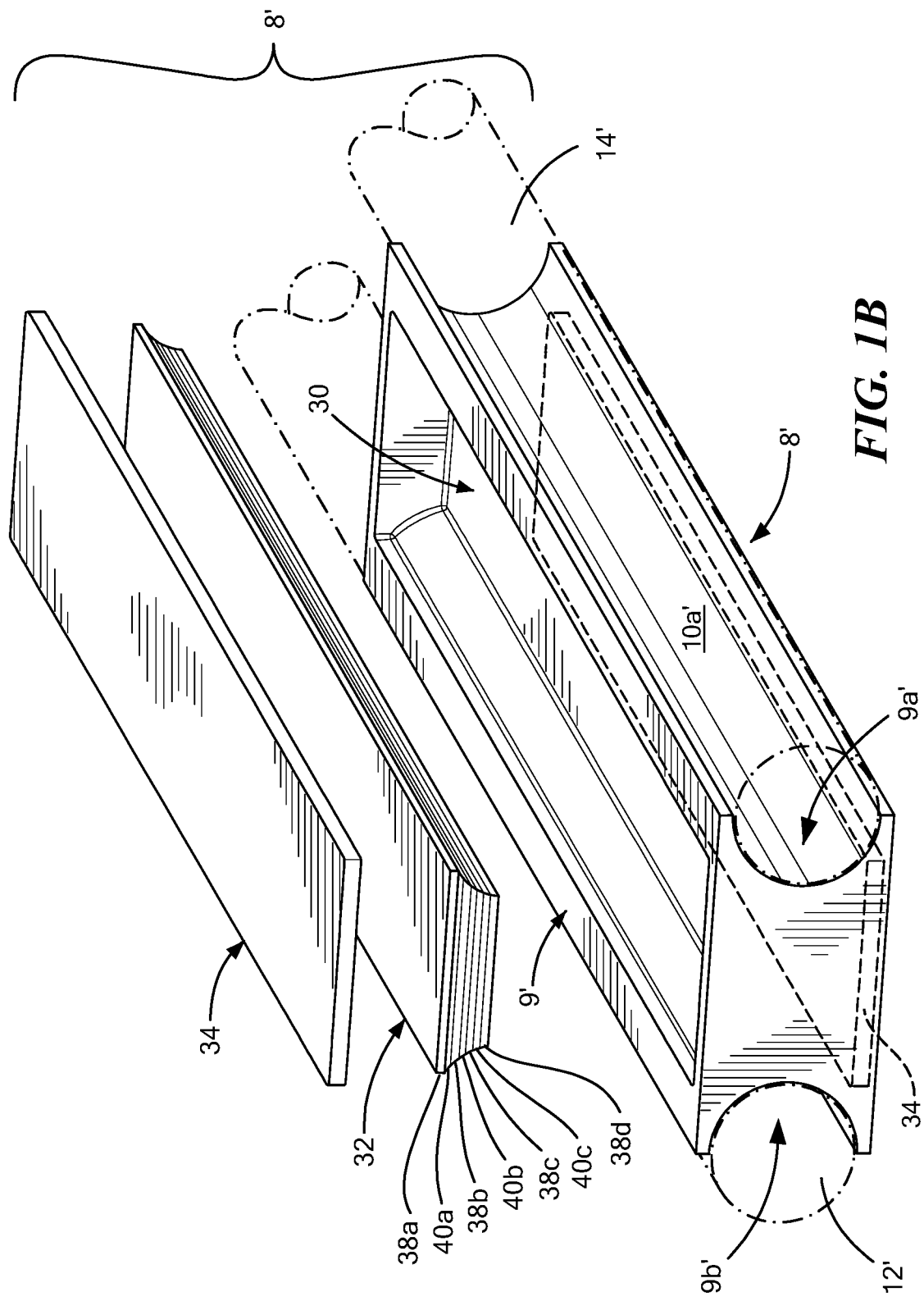
FIG. 1B is an exploded perspective view of a superconducting cable joint having two superconducting cables coupled thereto.
Figure 1C:
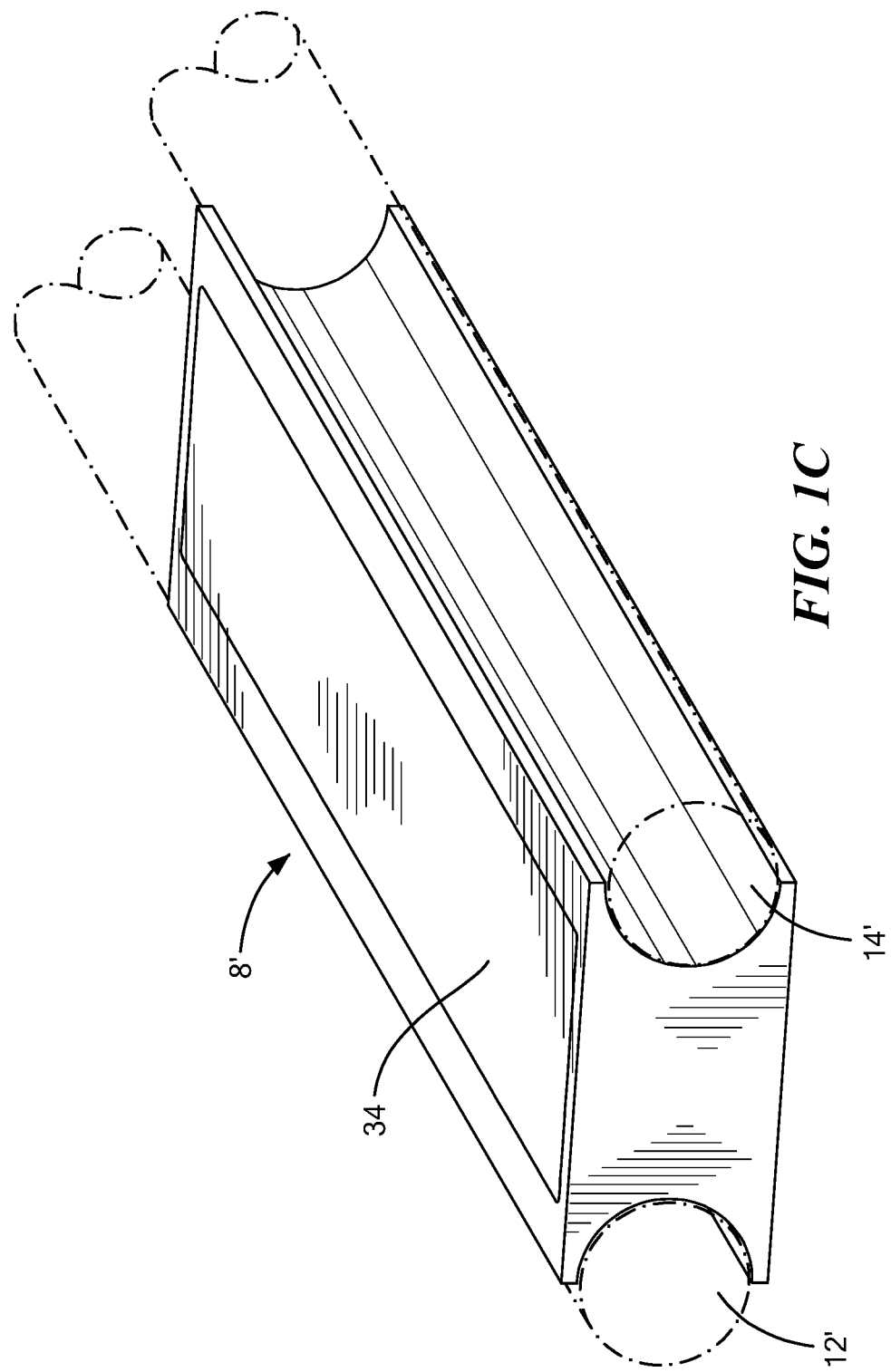
FIG. 1C is a perspective view of the superconducting cable joint of FIG. 1B having two superconducting cables coupled thereto.

Referring now to FIGS. 1-1C in which like elements are provided having like reference designations throughout the several views, a superconducting joint 8 has a main body or conducive member 9 having conductor mounting regions 9a, 9b on opposing sides thereof. Although mounting regions 9a, 9b are herein shown on opposing sides of conducive member 9, those of ordinary skill in the art will appreciate that mounting regions 9a, 9b can be oriented in different position other than that specially illustrated in FIG. 1. For example, in embodiments, it may be desirable or even necessary to provide conductive member 9 having a shape such that mounting regions 9a, 9b are on opposite sides but offset from each (i.e. not aligned as illustrated in FIG. 1) or mounting regions 9a, 9b may be provided at a 90 degree angle with respect to each other. Other variants are also possible. The particular location and orientation of mounting regions in conducive member 9 is selected to meet the needs of a particular application.

Mounting regions 9a, 9b have associated mounting surfaces 10a, 10b (only mounting surface 10a being visible in FIG. 1). In this illustrative embodiment, mounting regions 9a, 9b are provided as C-shaped (or semi-circular) regions in conductive member 9 to thus provide superconducting joint 8 having a so-called "double-saddle" shape. Thus, in embodiments conductive member 9 is sometimes referred to as a saddle member.

As will be described in detail hereinbelow, saddle member 9 comprises a superconducting material (e.g. a high temperature superconductor (HTS) or LTS material) embedded or otherwise provided or disposed therein. Thus, it may be said that superconducting material is embedded or "packed" within saddle member 9.

In embodiments, the superconducting material may be arranged in the saddle member in such a way as to provide a superconducting signal path through conductive member 9 and thus between conductors 12, 14 disposed in contact regions 9a, 9b. Such an arrangement of superconducting material in the saddle member 9 decreases the total electrical resistance between cables 12, 14 while preserving the intrinsic benefits (i.e. simplicity, manufacturability, cost) of this joint design and operation. It should be appreciated that when the superconducting material in conducting member 9 is an HTS tape, the orientation of the tape should be such that a (re)BCO-HTS side of the tape is disposed nearest to the conductor to be joined. One example of HTS tape will be described below in conjunction with FIG. 7.

Cables 12, 14 may be secured in mounting regions 9a, 9b via clamps, brackets or other structures or means (generally, clamping structures). Any clamping structure capable of applying a desired amount of force to the cables 12, 14 may be used. One example of a clamping structure is described below in conjunction with FIG. 3A. In some embodiments, a clamping structure capable of applying a pressure of about 40 MPa may be used. The amount of pressure required is selected in accordance with a variety of factors including but not limited the requirements of a particular application (e.g. the amount of current flowing through the joint) as well as the mechanical characteristics of the joint (e.g. length of joint, cable diameters, materials, cable shapes).

The particular shape of mounting regions 9a, 9b is selected to match the shape of a conductor with which superconducting joint 8 is intended to interface. Thus, while in this example superconducting joint 8 is intended to interface with conductors having a generally circular, or semi-circular, cross-sectional shape, it should be appreciated that mounting regions 9a, 9b may be provided having any regular or any irregular geometric shape selected to accept a cable shape.

For example, mounting regions 9a, 9b may be provided having a rectangular, square, oval or a multi-faceted geometric shape. Also, each mounting region may be provided having a different shape (e.g. so as to join cables having different shapes).

In embodiments, saddle member 9 may be provided in whole or in part from an electrically conductive material. For example, saddle member 9 may comprise copper. Saddle member 9 may comprise, for example, a high conductivity copper (e.g. C101 copper). Other materials having electrical and mechanical/structural characteristics which are the same as or similar to the electrical and mechanical/structural characteristics of C101 copper may, of course, also be used.

The surfaces of the cable and/or the mounting surfaces may have defects therein (i.e. have pits or peaks) and thus may be said to be rough. Such defects may prevent or reduce the amount of surface area contact between the surfaces of the cable and the mounting region. Thus, disposed on the mounting surfaces 10a, 10b of mounting regions 9a, 9b is an electrically conductive material which promotes electrical conductivity between the cable and the conductive member.

In this example embodiment, the conductive material is disposed in strips or lines as indicated by reference numerals 11 in FIG. 1. The conductive material may be provided as wires or ribbons (e.g. a tape). In embodiments, the wires/ribbons may have a round, oval, square or rectangular shapes. The particular cross-sectional shape of the wire/ribbon is not significant and other shapes may also be used.

In embodiments, the conductive material may be disposed on the mounting surfaces by winding it onto the outer surface of the cable and disposed the cable in the mounting region. In embodiments, the nominal distance between strips 11 is in the range of about 3 to about 4 times the wire diameter. In embodiments, when the conductive material is provided as round wire, the wire diameter may be in the range of about 1 to about 1.5 mm. In embodiments, the conductive material may comprise indium. In embodiments, indium tape can also be used. In embodiments, the conductive material may be a conductive wire such as on indium wire. It has been discovered that using an indium wire promotes electrical contact (and ideally ensure excellent electrical contact) as the wire deforms under load it spreads which break the wire surface oxide layer providing virgin indium to the contact surface thus increasing (and ideally maximizing) the electrical conductivity between a conductor to be joined and the conductive member.

In embodiments, the conductive material 11 may be provided as a metal and preferably as a soft metal. For example, a metal having a malleable characteristic at room temperature (e.g. temperatures in the range of about 55 F to about 90 F) may be used. As will become apparent from the description provided herein below, conductive material 11 is arranged such that when conductors (e.g. cables 12, 14) are disposed in respective ones of the mounting regions, the conductive material 11 is disposed between surfaces of the HTS conductors 12, 14 and surfaces 10a, 10b of the mounting regions.

In embodiments, a metal capable of deforming to provide a substantially uniform metal layer (and ideally a highly uniform metal layer) on a mounting surface of the mounting region is preferred.

Such a uniform deformation and resulting layer results in a uniform contact between a surface of a conductor disposed in the mounting region and a surface of the mounting region. A metal which deforms to allow such a uniform (and ideally a highly uniform) contact results in a low resistivity path (e.g. on the order of a nano-ohm) between the cable and saddle member 9. It should be noted that the uniformity of the thickness of the interface layer contributes to a low resistance path however the fact that the soft material, (indium) fills the peaks and valleys of the surface roughness, increases the contact surface between the two components. Without the malleable metal one ends up with many point and line contacts between the cable surfaces and mounting surfaces 10a, 10b in the mounting regions 9a, 9b rather than a surface contact. Therefore the use of malleable metal which forms a continuous, contiguous interface layer increase the effective surface area and decreases resistance between a cable (e.g. cables 12, 14) and conductive member 9.

In embodiments, the metal 11 may be provided as indium. Since indium is a soft metal at room temperature, it deforms to provide a continuous and thus low resistivity, contact layer between a surface of the HTS conductor and surfaces 10a, 10b of the saddle member 9.

In this example embodiment, a pair of superconducting cables 12, 14 (each having a generally circular cross-sectional shape) are disposed on respective ones of mounting surfaces 10a, 10b. Thus, in this example, conductive member 9 is disposed between the two superconducting cables 12, 14.

In the example embodiment of FIGS. 1 and 1A, superconducting cables 12, 14 may correspond to high temperature superconductor (HTS) cables.

As most clearly seen in FIG. 1A, and taking cable 12 as representative of cables 12, 14. HTS cable 12 comprises former 16 having a diameter D1 and having HTS tapes 18a-18d disposed in channels provided in the former 16. HTS tapes 18a-18d are held in their respective channels via solder 19a-19d. An inner jacket 20 (e.g. a copper jacket) having a diameter D2 is disposed around the former and HTS tapes. An outer jacket 24 (e.g. a steel or stainless steel jacket) having a diameter D3 is disposed around inner jacket 20.

According to some embodiments, the HTS may comprise a rare earth barium copper oxide superconductor (REBCO), such as yttrium barium copper oxide (YBCO). In some embodiments, the HTS may comprise a co-wound stack of HTS tape. In embodiments, the HTS tape may comprise a long, thin strand of HTS material with cross-sectional dimensions in the range of about 0.001 mm to about 0.1 mm in thickness (or height) and a width in the range of about 1 mm to about 12 mm (and with a length that extends along the length of the cable, e.g., into and out of the page in the example of FIG. 1). According to some embodiments, each strand of HTS tape may comprise an HTS material such as REBCO in addition to an electrically conductive material. In some embodiments, the electrically conductive material may be disposed on the REBCO. In some embodiments, the electrically conductive material may be a cladding material such as copper. In some embodiments, HTS tape may comprise a polycrystalline HTS and/or may have a high level of grain alignment. One example of an HTS tape is described below in conjunction with FIG. 7.

In embodiments, the HTS conductors 12, 14 are pressed into the superconductive HTS saddle 9 such that the soft metal 11 is disposed between a surface of the HTS conductors 12, 14 and mounting surfaces 10a, 10b of the superconductive joint 8. Thus, in embodiments, the conductors 12, 14 may be provided as HTS cables which are pressed or otherwise disposed into respective ones of contact regions 9a, 9b with indium therebetween.

In such embodiments, cables 12, 14 are prepared prior to insertion in mounting regions 9a, 9b illustrated in FIG. 1. As part of the preparation, portions of outer jacket 24 are removed to reveal underlying inner jacket 20. Surfaces of the inner jackets 20 are prepared prior to insertion of the conductors into the contact regions 9a, 9b. Such preparation includes cleaning the exposed inner jacket conductors. Such cleaning may be accomplished via mechanical or chemical techniques. For example, cleaning may be accomplished through lapping or sanding the inner jacket 20 to remove oxides and improve conductivity. Once cleaned, all or portions of the exposed inner jacket 20 may optionally have a plating 22 disposed thereover. In embodiments a surface of the inner jacket may optionally be silver plated. The cleaning and plating processes, together with the use of metal 11, help increase (and ideally maximize) contacting surface areas and high electrical conductivity between the conductors 12, 18 and joint 8.

This relatively simple preparation process is in strong contrast to preparation process low temperature superconductor (LTS) cables and other high temperature superconductor (HTS) cables which require preparation and precision fabrication steps which are more time-consuming and complex compared with the preparation and fabrication approach described herein.

Although a particular superconducting cable geometry has been described in FIGS. 1 and 1A, those of ordinary skill in the art will appreciate that the superconducting joint structures and techniques described herein may be utilized with any type of superconducting cable including superconducting cables having any geometry or provided from any technique. After reading the disclosure provided herein, one of ordinary skill in the art will understand how to make any appropriate joint modifications needed to accommodate a particular cable.

Referring now to FIGS. 1B, 1C, a saddle member 9' which may be the same as or similar to saddle member 9 described in conjunction with FIG. 1, is provided having a cavity or recess region 30 into which a superconducting insert 32 is disposed. The superconducting insert 32 comprises a superconducting material configured to provide a superconducting signal path between first and second mounting surfaces (with only surface 10a' being visible in FIGS. 1B, 1C) of the saddle member. Thus, a superconducting signal path exists between the first and second cables 12', 14'. It should be noted that cables 12', 14' are shown in phantom since they are not properly a part of saddle member 9'. It should be noted that a second cavity and superconducting insert may be provided in the opposite side of saddle member 9' (i.e. the side not visible in FIGS. 1b, 1C).

In embodiments, saddle member 9' is formed or otherwise provided having a cavity 30. In embodiments saddle member 9' may be provided using additive or subtractive techniques. For example, saddle member 9' may be provided using 3D printing techniques or other additive techniques. Alternatively, a portion (e.g. a central portion) of saddle member 9' may be removed (e.g. via a milling technique or other mechanical technique) to provide cavity 30. The shape of cavity 30 is selected in accordance with a variety of factors including, but not limited to, the shape of conductors (e.g. cables 12', 14') to be disposed in or otherwise coupled to the mounting region of the saddle member 9' and ease of manufacturing of saddle member 9'.

Superconducting insert 32 is provided having a size and a shape selected such that superconducting insert 32 fits within cavity 30 without interfering with cover 34 while at the same time providing a superconducting signal path between external conductors coupled to the superconducting joint (i.e. cables 12 and 14 in the example embodiment of FIGS. 1B, 1C). In embodiments, superconducting insert 32 may be provided having an overall shape selected to match the shape of cavity 30. The current preferably travels through the HTS side of the tape. By having a feather out configuration it exposes the HTS side, thus allowing current to go through.

In the example of FIG. 1B, both recess 30 and superconducting insert 32 are provided having a generally truncated triangular cross-sectional shapes (which may also be referred to as a "feathered out" configuration). In particular, a first position of cavity 30 is wider than a second portion of cavity 30. The shape of cavity 30 and insert 32 is selected to reduce (and ideally, minimize) the resistance portion (i.e. the non-superconducting portion) of the saddle member which extends between the first and second mounting regions. In this way it is possible to increase (and ideally maximize) the length or quantity (e.g. as measured by area) of the HTS tape inserted within the saddle member thereby reducing (and ideally, minimizing) the total resistance through the saddle from one mounting region (e.g. region 9a') to the other mounting region (e.g. region 9b').

As will be described in detail in conjunction with FIG. 7, one type of HTS tape is asymmetric in the sense that HTS material is physically closer to one surface of the HTS tape than the other. The surface of the HTS tape to which the HTS material is closest in referred to herein as the "HTS Surface" or "HTS side" of the tape. When such an asymmetric HTS tape is used, it is preferred that the HTS tape is arranged such that the HTS side of the tape is closest to or directed towards the surfaces of the conductive member and/or a cable to be joined. Since current travels though HTS side of the tape, the above described "feathered out" configuration of the HTS insert 32 exposes the HTS side of the tape to the mounting regions in which the cables are disposed there by providing an HTS current path between the cables to the mounting regions.

The number of HTS tape layers to use in a particular application is selected in accordance with a variety of factors including but not limited to the amount of current which expected to pass through the conductive member. The details of example cavity shapes and superconducting inserts are described in conjunction with FIGS. 2-6B.

In one embodiment, superconducting insert 32 is provided from interleaved layers of HTS tapes and conductive sheets. In embodiments, the conductive sheets, may be provided as copper sheets.

In operation, current flows from a first conductor (e.g. cable 12') through one side of saddle member 9 (e.g. through surfaces of region 9a' disposed over surfaces of cable 12' through metal 11) and then flows along a path of least resistance through the superconducting material (e.g. through HTS tapes in the saddle member 9') to reach the other side of the saddle member 9' and pass through a layer of conductive member 9' (and optionally an interface layer 15) and into a second conductor (e.g. through surfaces of region 9b' in contact with or substantially in contact with surfaces of cable 14' through metal 11). As will be describe in detail below, the superconducting insert comprises layers of superconducting material (e.g. layer of HTS tapes) 38 interleaved with layers of a normal conductor 40 (e.g. copper sheets). In embodiments in which the superconducting material layers 38 comprise HTS tapes, the HTS tape layers closer to cover 34 (e.g. layer 38a) are longer that HTS tape layers closer to a center of conductive member 9'. The number of interleaved layers to use in a particular application is selected based upon a variety of factors including, but not limited to, the current passing through the joint.

Joint cover 34 is disposed over cavity 30 to thus seal the cavity. Cover 34 may be bonded, soldered or otherwise secured to the conductive member 9' to seal the cavity 30.

Figure 2:
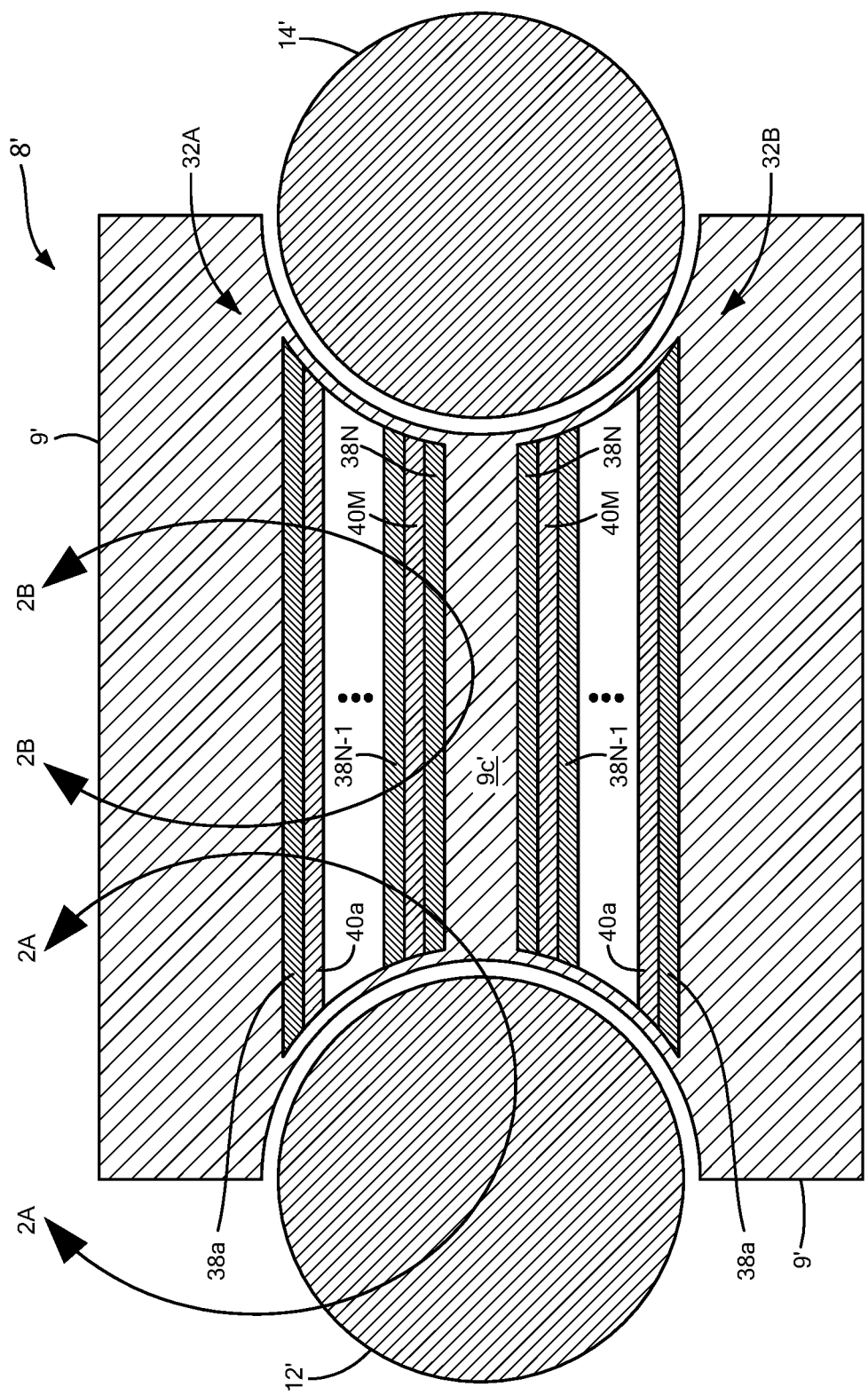
FIG. 2 is a cross-sectional view of a superconducting cable joint having two superconducting cables coupled thereto.

Referring now to FIGS. 2-2C in which like elements are provided having like reference designations, a conductive member 9' of superconducting joint 8' which may be the same as or similar to superconducting joint 8 described above in conjunction with FIGS. 1-1B has first and second conductors 12'14' coupled thereto. At least one of the first and second conductors 12', 14' is a superconducting cable. In general overview, conductive member 9' includes a pair of superconducting structures 32a, 32b (e.g. a structure comprising HTS tapes) inserted or otherwise disposed in respective ones of a pair of cavities 30a, 30b of conducting member 9'.

Cavities 30a, 30b are separated by a structural member 9c'. As shown in FIG. 2, The cavities may be formed without the need for a top cover. For example, the cavities may be formed having an aperture at one (or both) ends of a conductive member. The conductive member may be formed, for example using an additive process (e.g. a 3D printing process). The conductive member may also be formed using a subtractive process—e.g. via a mechanical or machining technique (e.g. milling, grinding or otherwise shaping or cutting a metal blank to form the conductive member) or a molding process.

Superconducting structures 32a, 32b are shaped so as to mechanically accept and electrically couple first and second conductors 12' 14'. Superconducting structures 32a, 32b comprise superconducting material arranged in the respective cavities so as to provide a superconducting signal path between conductors 12', 14'. As noted above, a first one of conductors 12', 14' may be a superconducting cable and a second one of conductors 12', 14' may be another superconducting cable or a normal (i.e. non-superconducting) cable (e.g. in the case of a termination to a power supply).

In embodiments, superconducting inserts 32a, 32b, comprise interleaved layers of superconducting layers 38a-38N and normal conducting layers 40a-40N–1. Conducting layers 40a-40N–1 may comprise any electrically conductive material. In embodiments, conducting layers comprise copper. It is noted that current typically enters the HTS tape through the sides and/or through the top and/or bottom surfaces of the HTS tape and interleaving the HTS tape with conductive layers (e.g. copper layers) 40a-40N–1 facilitates current flow into the HTS tape.

Figure 2A:
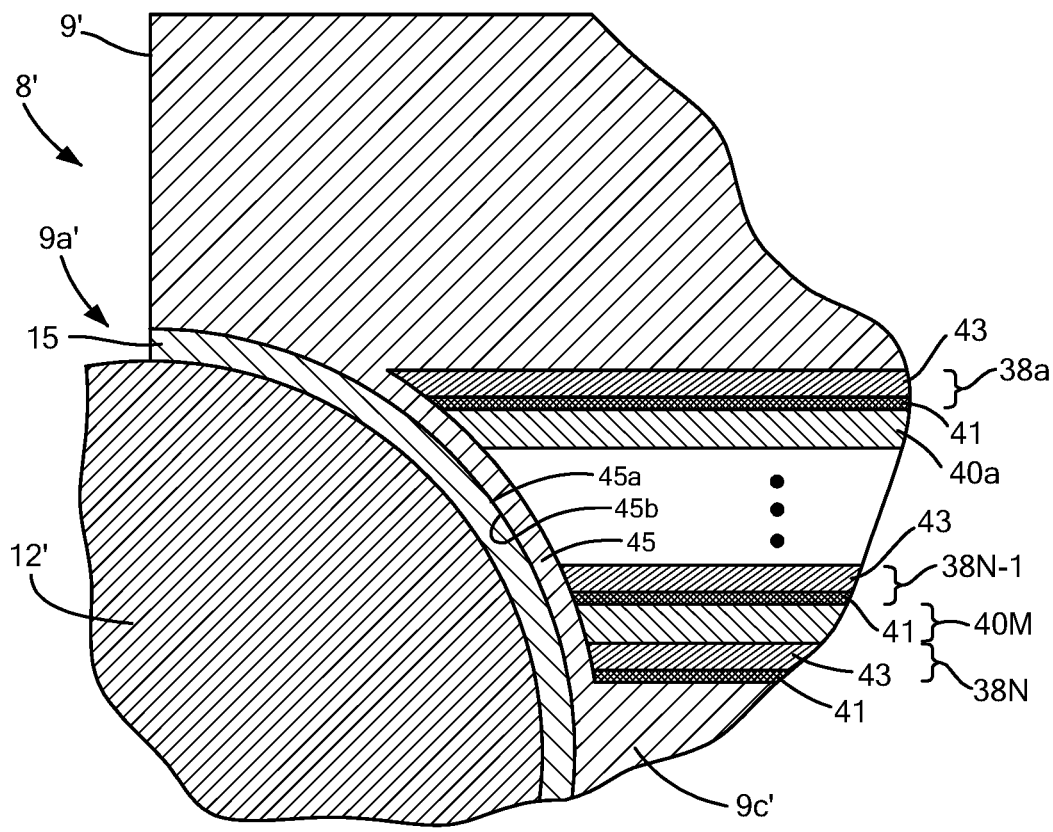
FIG. 2A is an enlarged cross-sectional view of a portion of the superconducting cable joint and superconducting cable taken along lines 2A-2A of FIG. 2.
Figure 2B:
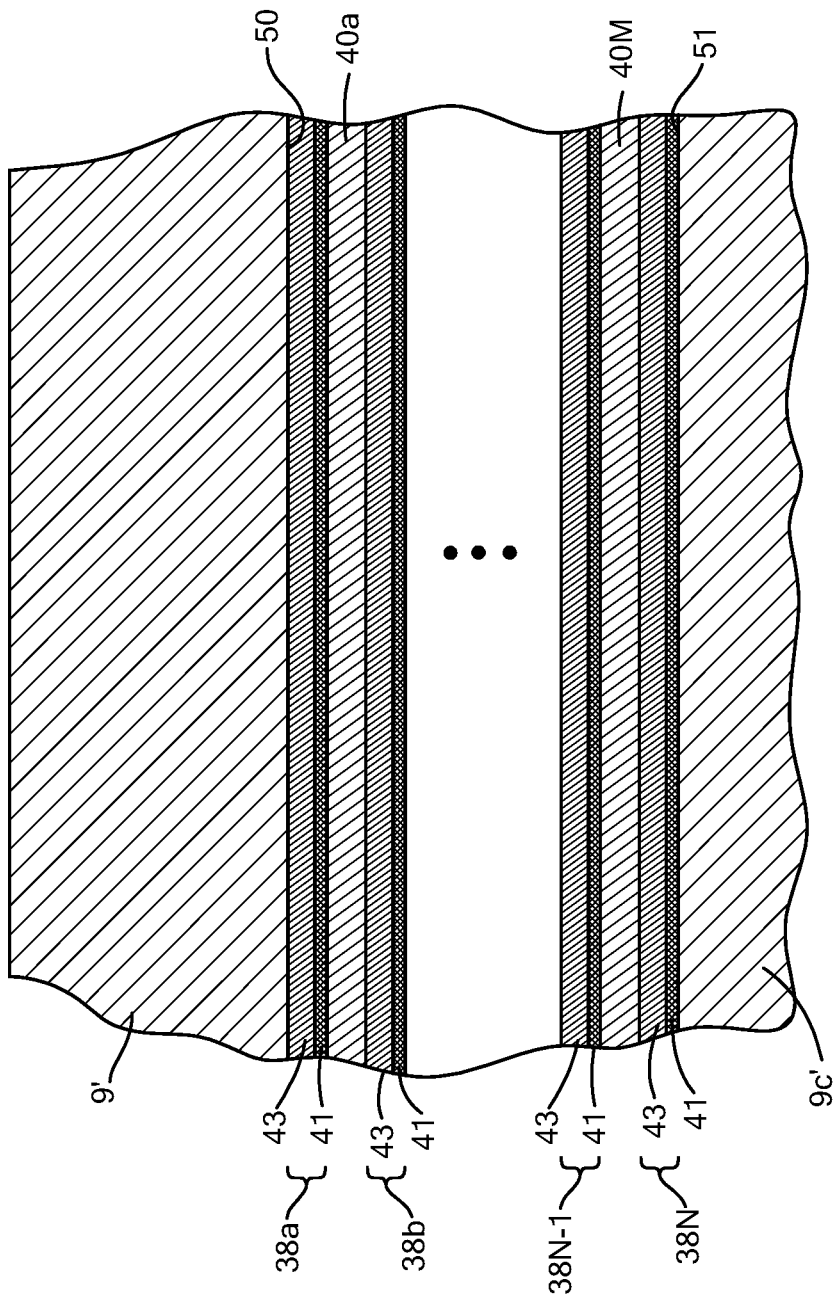
FIG. 2B is an enlarged cross-sectional view of a portion the superconducting cable joint of FIG. 2 taken along lines 2B-2B of FIG. 2.
Figure 7:
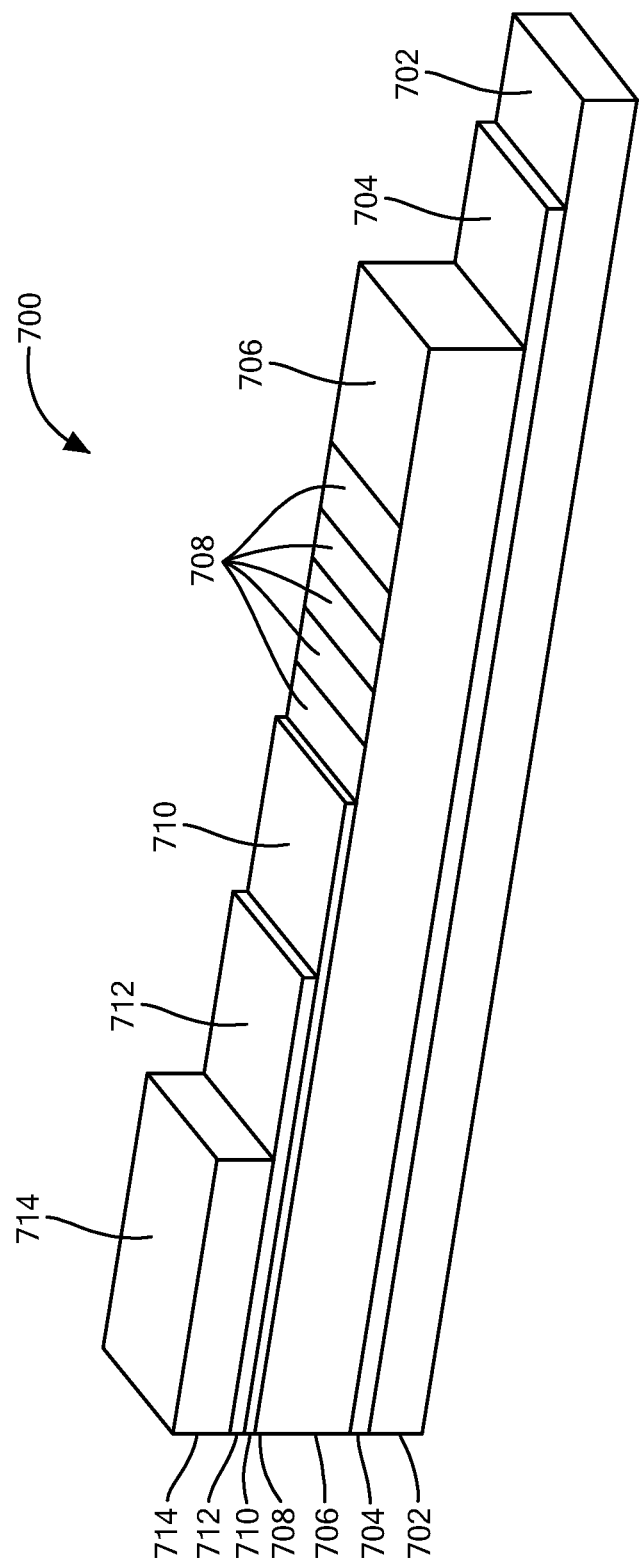
FIG. 7 is a perspective view of a high temperature superconducting tape.

In the illustrative embodiment of FIG. 2A, superconductive layers 38a-38N comprise an HTS tape such as the HTS tape described in FIG. 7. Thus, superconducting layers 38a-38N have an HTS side which is schematically illustrated in FIG. 2, 2B as layer 41. As will be apparent from the description herein below in conjunction with FIG. 7, layer 41 is only a schematic representation of the physical structure of an HTS tape (e.g. such as that shown and described in FIG. 7) used to illustrate a surface of an HTS tape to which an HTS material is closest.

Significantly, superconducting surfaces 41 of superconducting layers 38a, 38d are proximate to (and ideally in direct contact with) surfaces of electrically conductive member 9' which are proximate the cable 12'. Since superconducting layers 38a-38N are coupled to cables 12' through surfaces of electrically conductive member. Thus, a superconducting signal path is provided from one conductor (e.g. conductor 12') through the conductive member 9' (e.g. through interface layer 15 and wall 45) to a second conductor (e.g. conductor 14').

The first and second conductors are disposed (e.g. pressed or otherwise inserted) into respective ones of the mounting regions 9a', 9b'. In embodiments, the mounting regions of the superconducting joint include a malleable metal (which may be the same as or similar to malleable metal 11 described above in conjunction with FIGS. 1-1C).

As may be most clearly seen in FIG. 2A, upon inserting conductors 12', 14', into respective ones of the mounting regions 9a', 9b' (with only conductor 12' and contact region 9a' visible in FIG. 2A), the force of conductor 12' on the malleable metal forms an electrically conductive layer 15 (also sometimes referred to as interface layer 15). A similar layer 15 is likewise formed in contact region 9b'. Thus, each contact region 9a', 9b' includes an interface layer 15 between respective surfaces of the mounting regions and surfaces of the conductors 12', 14'. Such an electrically conductive interface layer 15 promotes electrical connection between the cables and the superconducting joint.

In embodiments, conductive layer 15 may be formed as follows. Contact region 9b' has a surface 45b (FIG. 2A) having a malleable conductive metal (e.g. metal 11 in FIG. 1) disposed on at least a portion thereof. The malleable conductive metal may, for example, be the same as or similar to conductive material 11 described in conjunction with FIG. 1. A conductor (e.g. cable 12') is pressed or otherwise disposed into mounting region 9a with enough force so as to deform the malleable conductive material and form conductive layer 15. In embodiments, conductive layer ideally forms a continuous (i.e. unbroken) surface along the entire or substantially entire mounting surface (e.g. mounting surface 10a in FIG. 1). In embodiments, interface layer 15 is provided having substantially uniform thickness. In embodiments, layer 15 may be provided from indium. In embodiments, the interface layer 15 may comprise silver.

As illustrated in FIG. 2A, end portions of superconducting layers 38-38N contact surface 45a.

Referring now to FIG. 2C, superconducting insert 32 comprises a plurality of interleaved superconducting and non-superconducting layers 38a-38N, 40a-40N−1, extending from a first surface 50 of saddle member 9' to a second surface 51 of saddle member at structural portion 9c''. The number of layers to interleave is selected in accordance with a variety of factors including, but not limited to total cable current which is expected to flow through conductive member 9'. In embodiments, the total cable current is determined and the size of the joint and the amount of HTS material required to carry the cable current are determined.

Figure 3:
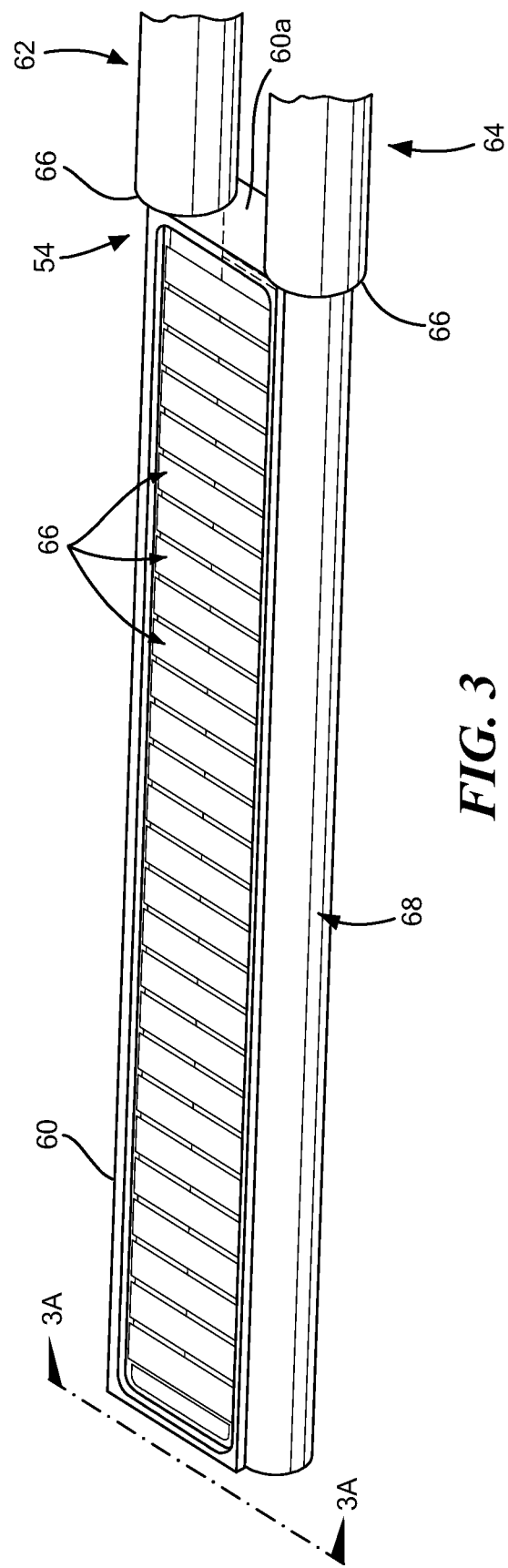
FIG. 3 is a perspective view of a superconducting cable joint having a pair of superconducting cables coupled.
Figure 3A:
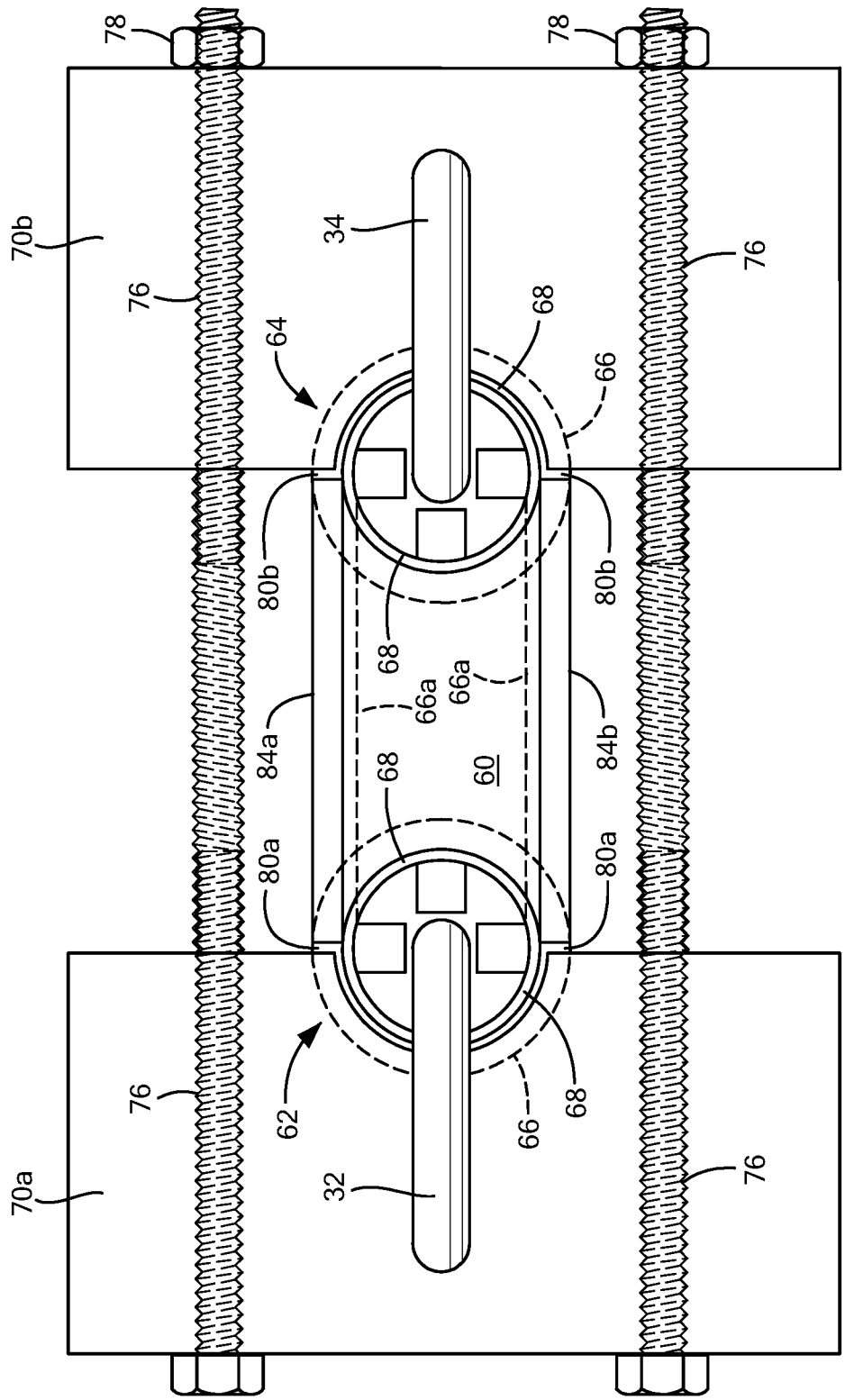
FIG. 3A is an end view the superconducting cable joint of FIG. 3.

Referring now to FIGS. 3 and 3A in which like elements are provided having like reference designations, a conductive member 60 which may be functionally the same as conductive members 9, 9' described above in conjunction with FIGS. 1, 1B, has a pair of superconducting cables 62,64 coupled thereto. Superconducting cables 62, 64 may be the same as or similar to superconducting cables 12, 14 described about in conjunction with FIGS. 1, 1A. It should, of course, also be understood that one of the cables 62, 64 may have any configuration.

Cables 62, 64 (at least one of which may be a superconducting cable) are electrically coupled via superconducting bands 66. The length of the joint and the number of bands 66 to use in a particular application is selected in accordance with a variety of factors including, but not limited to, the amount of current being carried by the conductors and through the joint. The size, spacing and physical configuration of conductive member 60 is based upon a number of factors, including, but not limited to, the number of bands and the geometry (including, but not limited to location, size, spacing and orientation of the mounting regions) to accept the cables (or more generally conductors) to be joined.

It should be noted that in embodiments bands 66 may comprise an HTS tape such as that described in FIG. 7, for example. In this case, the HTS side 66a of the HTS tape is directed towards (i.e. facing) the conductors 62, 64 to be electrically joined. In such embodiments, it is preferred to have the HTS tape as long as possible between the two cables.

It should also be noted that in the illustrative embodiment of FIGS. 3, 3A cables 62, 64 have external jackets 66 and internal jackets 68 (similar to the cables 12, 14 described above in conjunction with FIGS. 1, 1A). Portions of external jacket 68 have been removed to expose internal jacket 68. Thus, surfaces of internal jacket 68 contact mounting regions of conductive member 60 (e.g. in direct contact with surfaces of the mounting regions or in direct contact with an interface layer disposed between a surface of jacket 68 and a surface of the mounting region).

Referring now to FIG. 3A, HTS cables 62, 64 are pressed or otherwise disposed into mounting regions of conductive member 60 using a joining means. In this example embodiment, the joining means is illustrated as a pair of brackets 70a, 70b secured to or about conductive member 60 via a nut 76 and bolt 78 arrangement. Thus, brackets 70a, 70b, nuts 76 and bolts 78 form a clamping structure.

In alternate embodiments, brackets 70a, 70b may be secured about saddle member 60 via screws configured to mate with threaded bores (e.g. threaded bores in the brackets 70a, 70b). Other joining structures and joining techniques may, of course, also be used to secure the cables to the conductive member. For example, in embodiments, the joining means may comprise spring-type structures. Alternatively, in embodiments, a permanent coupling means may be used (e.g. in embodiments in which the cables need not be demountable, the cables may be welded or otherwise permanently fixed to the mounting regions of the conductive member. The joining means (e.g. clamps or other cable securing structure) extends along the length of the conductive member.

Other techniques or means for clamping or otherwise securing cables 62, 64 with sufficient force to enable a desired electrical connection not specifically described herein may, of course, also be used. Regardless of the particular manner in which the joining means is implemented, the joining means should ensure substantially constant contact (and ideally, constant contact) between conductors to be joined and respective mounting regions in which the conductors are disposed. In embodiments, such substantially constant contact should preferably be maintained throughout a cycle of operation including cooldown from room temperature to cryogenic temperatures (e.g.

temperatures in the range or about 293 to 4 Kelvin). Dielectric spacers 80*a*, 80*b* are disposed between surfaces of brackets 70*a*, 70*b* and inner jackets 68.

Top and bottom covers 84*a*, 84*b* are disposed over cavities in the conductive member 60 in which the superconducting bands 66 are disposed, to thus cover the bands and seal the cavities.

Figure 4:
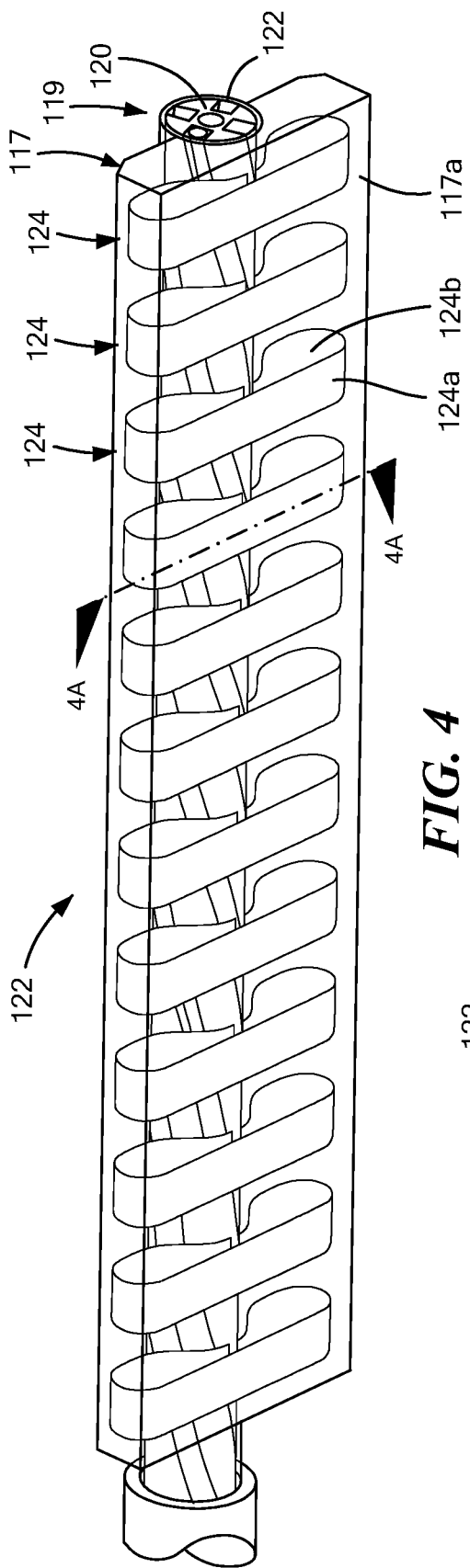
FIG. 4 is a perspective view of another embodiment of a superconducting cable joint made transparent to reveal superconducting material disposed therein.
Figure 4A:
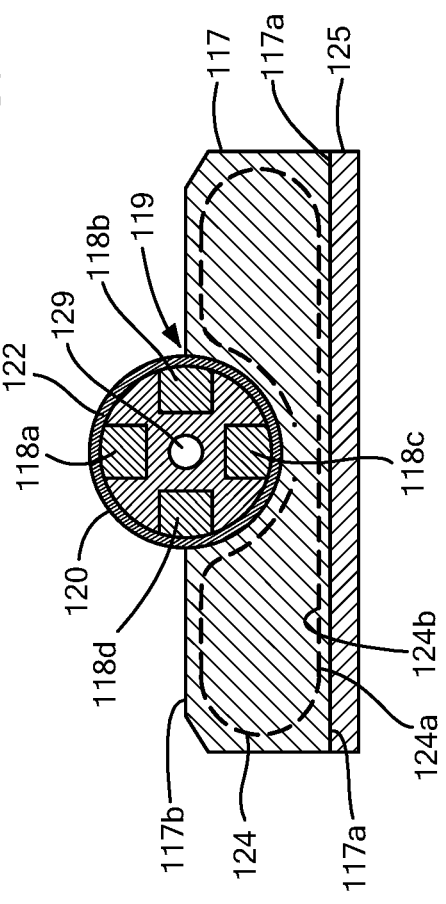
FIG. 4A is a cross-sectional view taken along lines 4A-4A of FIG. 4.

Referring, to FIGS. 4 and 4A, a saddle member 117 has a conductor mounting region 119 located in a center portion of a surface thereof. A superconducting cable 120 is disposed in the mounting region. Superconducting cable 120 may be the same as or similar to cables 12, 14 described above in connection with FIGS. 1,1A. Superconducting cable 120 may, of course, be provided as any type of superconducting cable. It should be noted that in FIG. 4, saddle member 117 is made transparent to reveal a superconducting structure 122 comprised of a plurality of scalloped-shaped bands 124. Bands 124 have first and second opposing surfaces 124*a*, 124*b* with surfaces 124*a* corresponding to superconducting surfaces which face a surface of cable 122. Thus, in embodiments in which the bands 124 comprise an HTS tape such as that described in FIG. 7, the HTS tape is oriented such that the (HTS side is disposed nearest to the cable 120.

It should be appreciated that the embodiment of FIG. 4 is well suited for used as an interface joint where the current carried by cable 120 flows from the center of member 120 and then sideways and is directed through the bands 124 toward surface 117*a*. As can be seen in FIG. 4A, surfaces 117*a*, 117*b* are configured to accept the shape of a conductor to be disposed thereon. Here surface 117*a* has a semi-circular cross-sectional of shape so as to accept a portion of a circular cable such as cable 120. Surface 117*a*, on the other hand is flat so as to accept a cable have a flat shape or at least a flat surface (e.g. having a rectangular cross-sectional shape). Thus, in this illustrated embodiment, surface 117*a* is configured to accept for example, a bus bar 125 (shown in FIG. 4A, but omitted from FIG. 4 for clarity). Thus, current can flow between cable 120 and bus bar 125. For compression purposes, joining means (such as any of the joining means describe above in conjunction with FIG. 3A) may be used to secure cable 120 and bus bar 125 to the appropriate surfaces of conductive saddle member 117.

As noted above the superconducting structure 122 is provided from one or more scallop-shaped bands comprising a normal conductor and having superconducting material disposed thereon. In embodiments, a pair of normal conductors may be disposed on opposing surfaces of a superconducting material (e.g. an HTS tape). That is, the superconducting material is disposed between a pair of conductors (e.g. in a sandwich configuration or interleaved configuration). Thus, in embodiments, conductive pieces 124 may be provided as one or more scallop-shaped copper pieces with superconducting material disposed between the pieces and the superconducting material may be provided as HTS tape. One advantage of this joint structure is that it allows one to change or transition the form factor of the cables (e.g. from a cable having a circular cross-sectional shape to a conductor (e.g. another cable or a bus bar having a rectangular cross-sectional shape).

Figure 5:
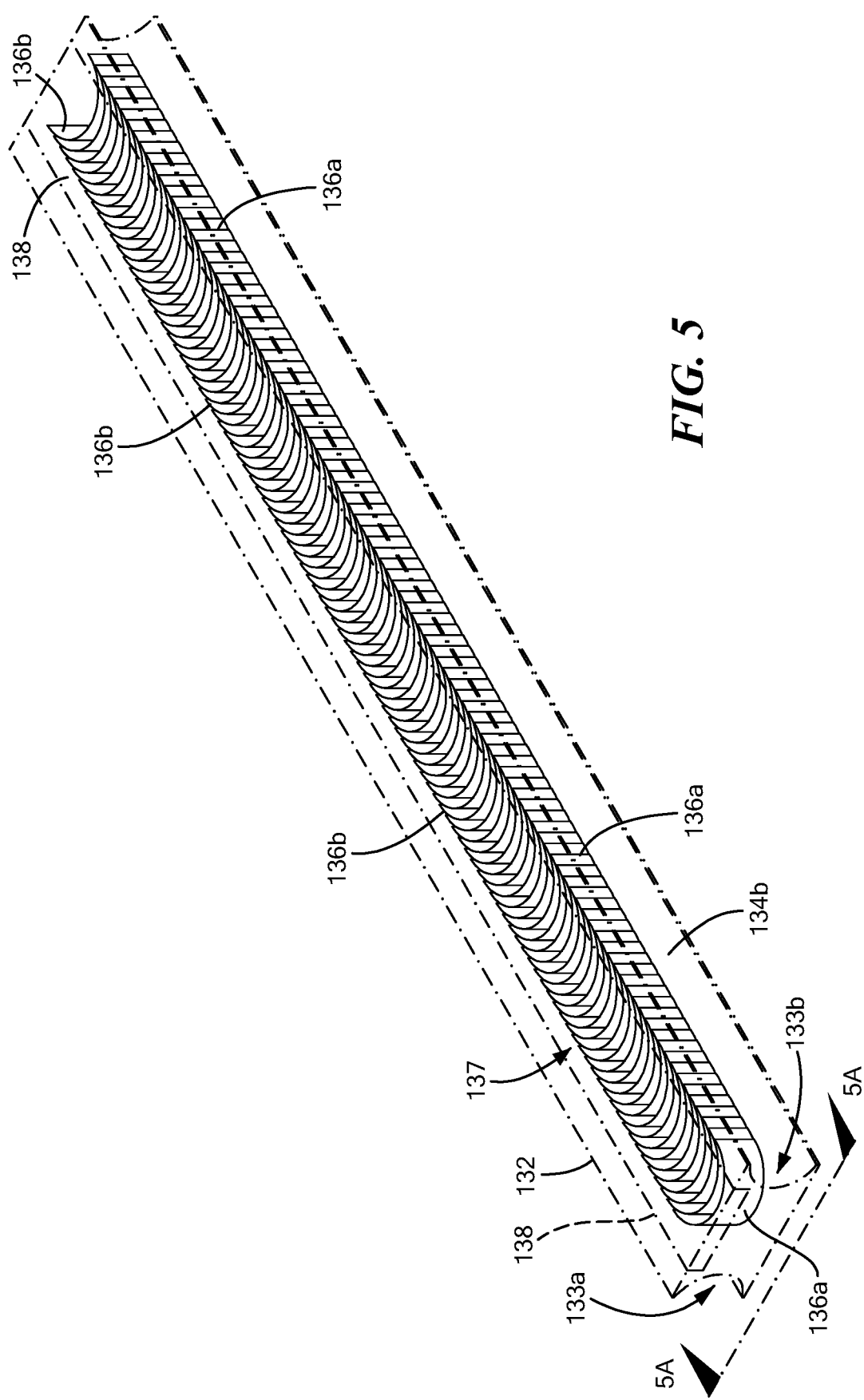
FIG. 5 is a perspective view of a superconducting cable joint made transparent to reveal superconducting material disposed therein.
Figure 5A:
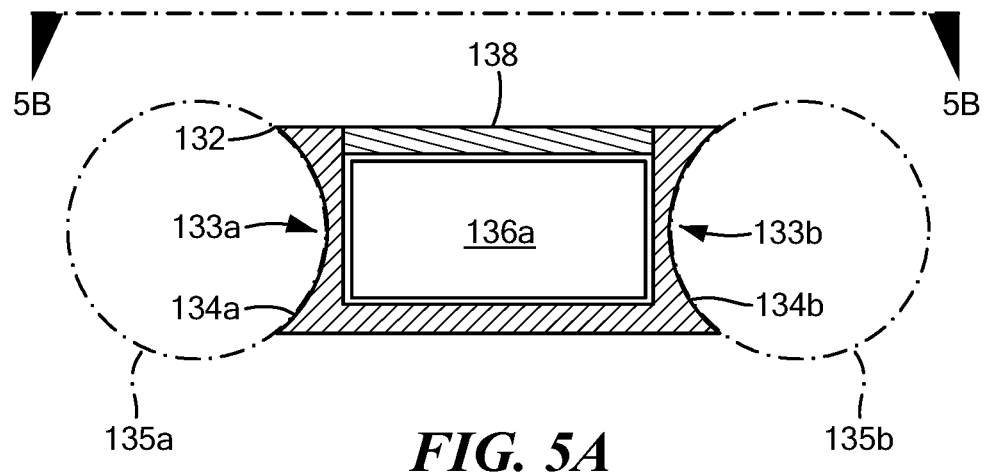
FIG. 5A is an end view of the superconducting cable joint of FIG. 5.
Figure 5B:
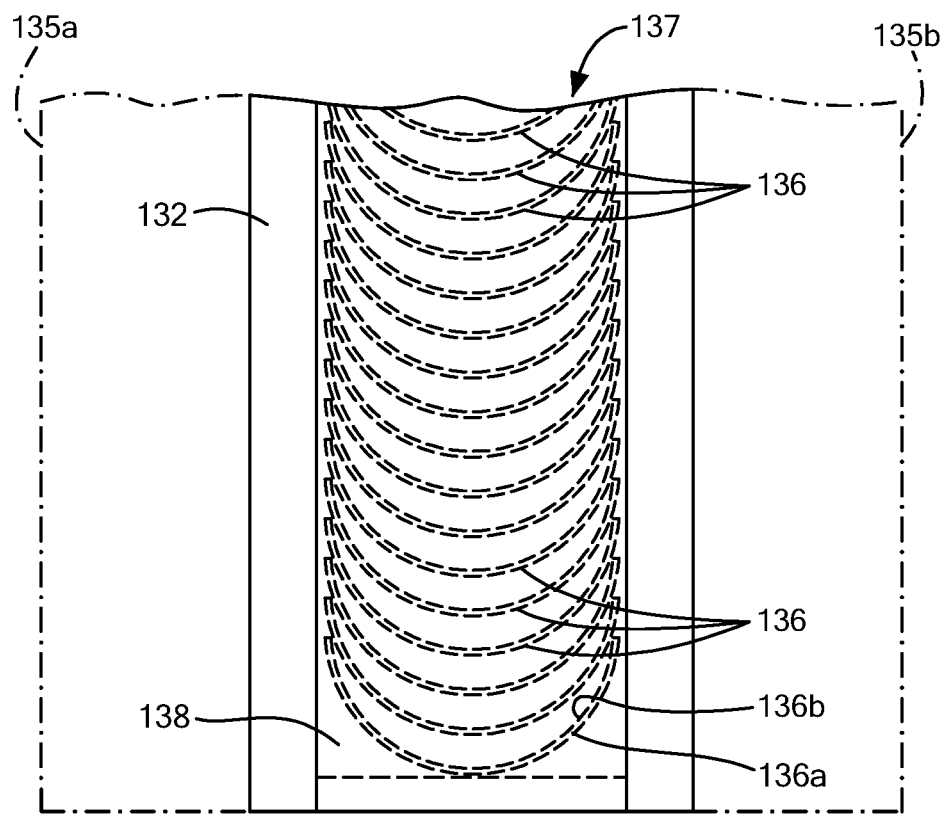
FIG. 5B is an enlarged top view of portion of the superconducting cable joint of FIG. 5.

Referring now to FIGS. 5-5B in which like elements are provided having like reference designations, a saddle member 132 (here shown in phantom to reveal an underlying superconducting insert or 137 structure) has first and second mounting regions 133*a*, 133*b* with respective mounting surfaces 134*a*, 134*b* (with only mounting surface 134*b* visible in FIG. 5). Conductors 135*a*, 135*b* (omitted from FIG. 5 for clarity) may be disposed on the mounting surfaces 134*a*, 134*b*.

Saddle member 132 is made transparent to reveal a superconducting insert 137 embedded or otherwise disposed in an opening or cavity of saddle member 132. Superconducting insert 137 comprises a plurality of C-shaped superconducting elements 136. The elements 136 may have a normal conductive material disposed therebetween (e.g. for support). In this example embodiment, a cover 138 is disposed over the cavity and insert 137.

In embodiments, each superconducting element 136 may comprise or correspond to an HTS tape such as the HTS tape such shown and described in conjunction with FIG. 7. In this case, as may be most clearly seen in FIG. 5B, superconducting surfaces 136*a* (e.g. the HTS side of the HTS tape described in FIG. 7) are facing surfaces of mounting regions 133*a*, 133*b* such that a superconducting signal path exists between surfaces 134*a*, 134*b*. The manner in which the HTS tapes are arranged (i.e. the HTS side of the HTS tape nearest to the conductor) makes this approach well suited for an EDM manufacturing process.

Figure 6:
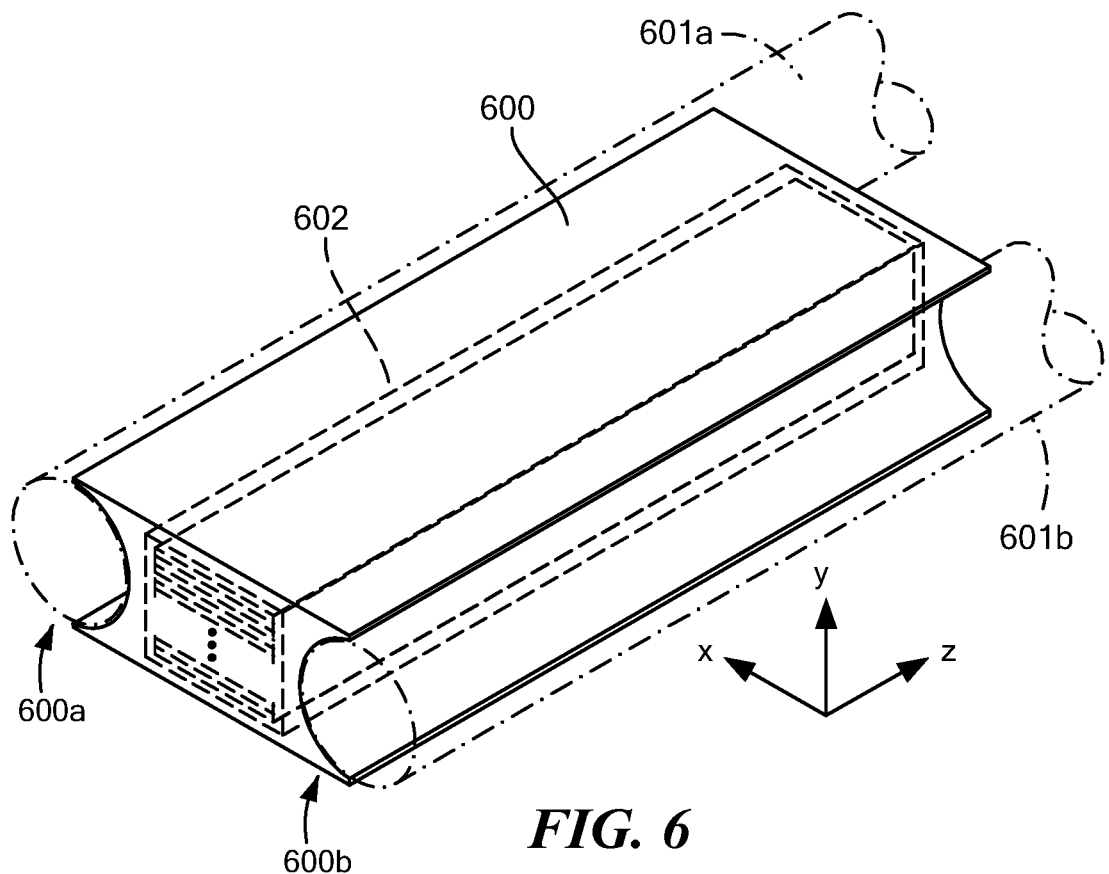
FIG. 6 is a perspective view of another embodiment of a superconductive cable joint.
Figure 6A:
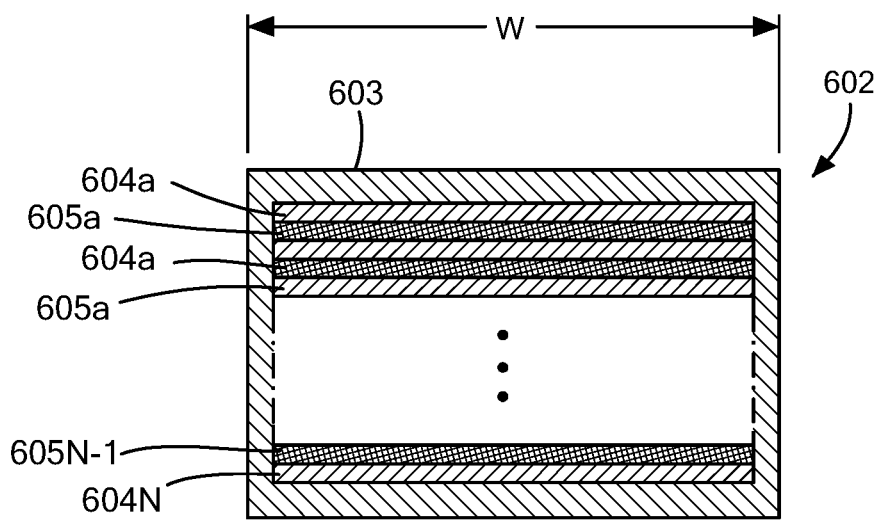
FIG. 6A is a cross-sectional view of a superconducting insert of the superconducting cable joint of FIG. 6 taken across lines 6-6A of FIG. 6B.
Figure 6B:
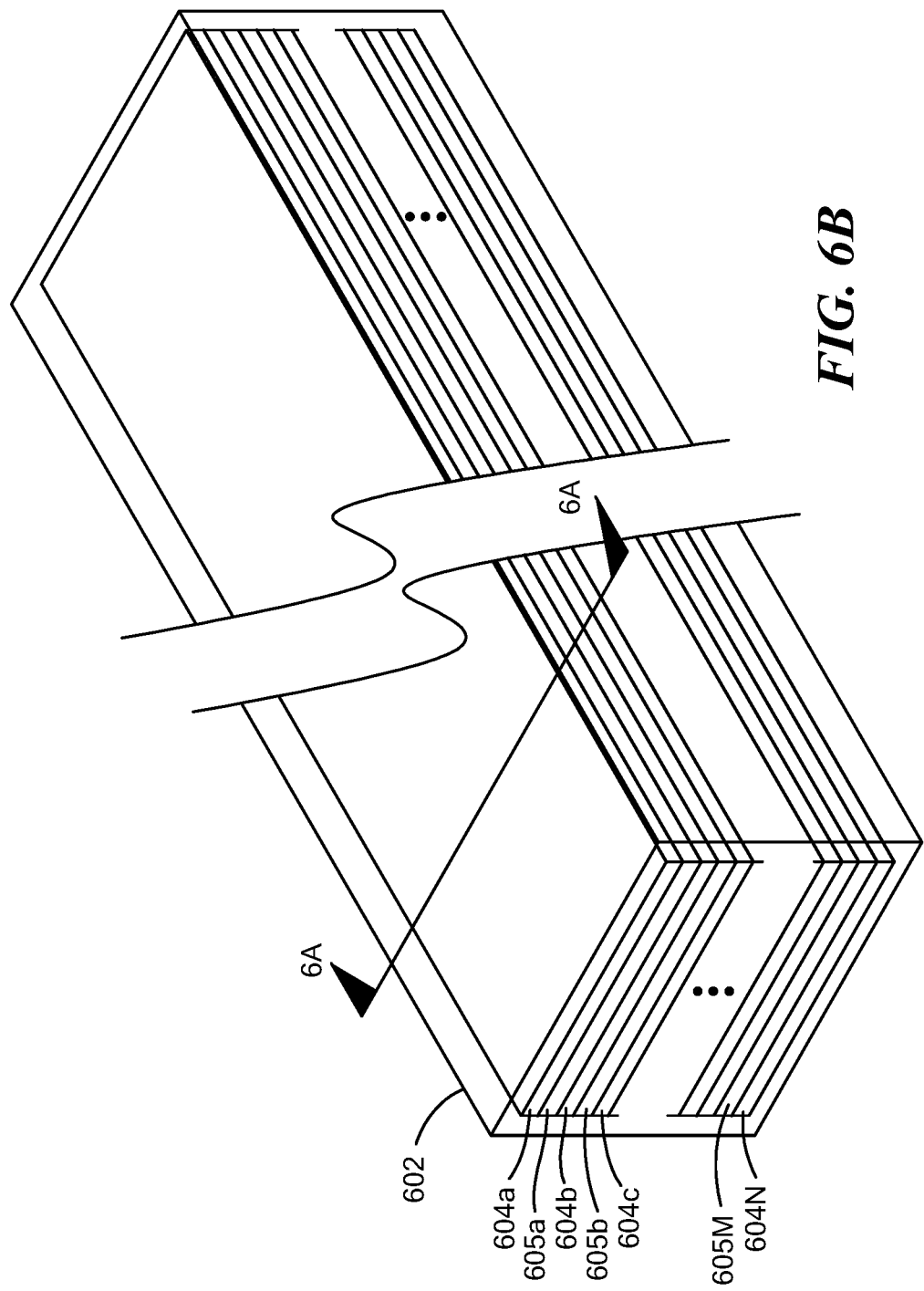
FIG. 6B is an isometric view of view of the superconducting insert of the superconducting joint of FIG. 6.

Referring now to FIGS. 6-6B, in which like elements are provided having like reference designations, a saddle member 600 has conductors 601*a*, 601*b* disposed in respective ones of conductor mounting regions 600*a*, 600*b* of saddle member 600. In embodiments, conductors 601*a*, 601*b* may be provided as HTS cables which may be the same as or similar to the cables described above in conjunction with FIGS. 1 and 1A. Saddle member 600 may be provided from a conductive material such as C101 Copper. Other conductor materials have electrical and mechanical characteristics which are substantially the same as or equivalent to the electrical and mechanical characteristics of C101 copper may, of course, also be used.

A superconducting insert 602 is disposed in a cavity of a conductive member 600. In this illustrative embodiment, superconducting insert is provided having a rectangular cross-sectional shape and comprises a plurality of superconducting layers 604*a*-604N (generally denoted 604) interleaved with normal conductor layers 605*a*-603N−1 (generally denoted 605). It should be noted that in embodiments in which superconducting layers 604 comprise an HTS tape such as the HTS described in conjunction with FIG. 7. The HTS tape is disposed along a length if the insert 602 and thus along a length of the conductive member 600 (i.e. in the direction of the z axis in the coordinate system of FIG. 6). Thus, the embodiment of FIG. 6 is well suited for use in application in which conductors to be joined (e.g. conductors 601*a*, 601*b*) are spaced by a distance which is equal to about the width of the HTS material (e.g. the width of an HTS tape or the width of several HTS tape coupled side by side. In such embodiments, the width of conductive member may be selected such that a small amount (and ideally, a minimum amount of normal conductive material is disposed between the conductors to be joined (e.g. cables 601*a*, 601*b*).

Referring to FIG. 6A, superconductive insert 602 comprises a housing 603 defined by walls. Disposed internal to the housing walls are the interleaved superconducting and non-superconducting layers. When superconducting layers 604 comprise an HTS tape such as that described in conjunction with FIG. 7, the HTS surface of the tape in layers 604N (i.e. the two outermost layers of the super conducting layers) are arranged such that they are directed towards (i.e.

face) the walls of housing 603. HTS surfaces of superconducting layers 604 between layers 604a and 604N may face in either direction.

Referring now to FIG. 7, an illustrative HTS tape includes a first layer 702 corresponding to a first stabilizer layer (here stabilizer layer 702 comprises copper). Disposed over layer 702 is an overlay layer 704 (here overlay 702 comprises silver). A substrate 706 is disposed over layer 704. In this example, substrate 706 may be provided from any suitable material and is provided having an electropolished surface. A buffer stack 708 is disposed over the substrate 706. In this example, buffer stack 708 may comprise one or more materials disposed via a magnetron sputtering technical. An HTS material 710 is disposed over buffer stack 708. In this illustrative embodiment, HTS material may comprise a rare earth barium copper oxide superconductor (REBCO) such as yttrium barium copper oxide (YBCO). Disposed over HTS material layer 710 is an overlayer 712 and disposed over overlay 712 is a second stabilizer layer 714. Overlayer 712 and stabilizer layer 714 may comprise the same materials as overlay 704 and stabilizer layer 702, respectively, as described above.

As can be seen in FIG. 7, HTS material layer 710 is physically closer to surface 700a of HTS tape 700 than it is to surface 700b. Thus, surface 700a is sometimes referred to as the "HTS surface" or the "HTS side" of HTS tape 700.

In embodiments, layer 702 may be about 50 μm thick, layer 704 may be about 2 μm thick, layer 706 may be about 50 μm thick, layer 708 may be about 0.2 μm thick, layer 710 may be about 1.6 μm thick, layer 712 may be about 1.6 μm thick and layer 714 may be about 50 μm thick.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal, "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A superconducting cable joint comprising:
   (a) a conducting member having a first mounting surface configured to accept a first superconducting cable, a second mounting surface configured to accept a second superconducting cable and having a cavity between the first and second mounting surfaces; and
   (b) a superconducting material disposed in the cavity of the conducting member and configured within the cavity to provide a superconducting signal path between the first and second mounting surfaces of the conducting member.

2. The superconducting cable joint of claim 1 wherein the superconducting material is part of a superconducting insert comprising at least one layer of a superconducting material and one layer of a normal electrical conductor.

3. The superconducting cable joint of claim 2 wherein the superconducting insert comprises alternating layers of a superconducting material and a normal electrical conductor.

4. The superconducting cable joint of claim 2 wherein the superconducting insert comprises a plurality of layers of a high temperature superconducting (HTS) tape interleaved with a plurality of layers comprising a normal electrical conductor.

5. The superconducting cable joint of claim 4 wherein the HTS tape has an HTS surface and the HTS tape is disposed in the cavity such that the HTS surface is directed toward at least one of the first and second mounting surfaces of the conducting member.

6. The superconducting cable joint of claim 1 wherein:
   the cavity is a first one of a plurality of cavities in the conducting member; and
      a superconducting material is disposed in each of the plurality of cavities.

7. The superconducting cable joint of claim 6 wherein the superconducting material comprises a high temperature superconducting (HTS) material.

8. The superconducting cable joint of claim 1 wherein the conducting member has an aperture open to the cavity and the superconducting cable joint further comprises a joint cover disposed over the aperture.

9. The superconducting cable joint of claim 1 wherein the superconducting material is formed in superconducting layers, wherein each of the superconducting layers comprises a high temperature superconductor (HTS) tape having first and second opposing surfaces with a first one of the first and second opposing surfaces corresponding to a superconducting surface.

10. The superconducting cable joint of claim 9 wherein each of the superconducting layers and conducting layers are arranged such that opposing outer layers of a superconducting insert correspond to superconducting surfaces of superconducting layers and the superconducting surface of outer layers of the superconducting insert are directed toward at least one of: a surface of the conducting member; and a surface of a cable to be joined.

11. A method for providing a superconducting joint, the method comprising:
   (a) providing a conductive member having first and second mounting surfaces and a cavity region;
   (b) providing a recess region in the conductive member, the recess region extending between the first and second mounting surfaces of the conductive member; and
   (c) disposing, as a superconducting insert, a superconducting material into the cavity region of the conductive member such that the superconducting insert provides a superconducting signal path between the first and second mounting surfaces of the conductive member.

12. The method of claim 11 further comprising forming the superconducting insert.

13. The method of claim 12 wherein forming the superconducting insert comprises:
   (a) providing a base superconducting layer having first and second opposing surfaces;
   (b) disposing at least one conductive layer over a first one of the first and second opposing surfaces; and
   (c) disposing one or more superconducting layers over a second one of the first and second opposing surfaces of the at least one conductive layer.

14. The method of claim 13 further comprising interleaving a plurality of superconducting layers and conducting layers.

15. The method of claim 14 wherein the plurality of superconducting layers comprise HTS tape having an HTS surface and the method further comprises interleaving HTS tape layers and conducting layers.

16. The method of claim 15 wherein interleaving HTS tape layers and conducting layers comprises arranging the HTS tape layers and conducting layers such that an HTS surface of outermost HTS tapes correspond to outer surfaces of the superconducting insert.

17. An electrical joint, comprising:
   a conductive member having a first mounting region configured to connect to a first conductor and a second mounting region configured to connect to a second conductor, wherein the first conductor comprises a cable;
   a superconducting material within the conductive member and configured to conduct a current between the first and second mounting regions; and
   a cavity in the conductive member and an insert in the cavity, the insert comprising the superconducting material.

18. The electrical joint of claim 17, wherein the cable is a superconducting cable.

19. The electrical joint of claim 17, wherein the second conductor comprises a superconductor or a normal conductor.

20. The electrical joint of claim 19, wherein the second conductor comprises a second superconducting cable.

21. The electrical joint of claim 17, wherein the superconducting material comprises a high temperature superconductor.

22. The electrical joint of claim 21, wherein the conductive member comprises a tape stack having the high temperature superconductor.

23. The electrical joint of claim 17, wherein the conductive member comprises alternating layers of normal conductor and superconducting material.

24. A method of forming an electrical joint, comprising:
forming a conductive member having:
a first mounting region configured to connect to a first conductor and a second mounting region configured to connect to a second conductor, wherein the first conductor comprises a cable;
a superconducting material within the conductive member and configured to conduct a current between the first and second mounting regions; and
a cavity in the conductive member and an insert in the cavity, the insert comprising the superconducting material.

25. The method of claim 24, wherein the cable is a superconducting cable.

26. The method of claim 24, wherein the second conductor comprises a superconductor or a normal conductor.

27. The method of claim 26, wherein the second conductor comprises a second superconducting cable.

28. The method of claim 24, wherein the superconducting material comprises a high temperature superconductor.

29. The method of claim 28, wherein the conductive member comprises a tape stack having the high temperature superconductor.

30. The method of claim 24, wherein the conductive member comprises alternating layers of normal conductor and superconducting material.

* * * * *